United States Patent
Gleadall et al.

(10) Patent No.: US 8,996,434 B2
(45) Date of Patent: Mar. 31, 2015

(54) AUTOMATED STATISTICS CONTENT PREPARATION

(71) Applicant: CBS Interactive Inc., San Francisco, CA (US)

(72) Inventors: George Barry Gleadall, Boca Raton, FL (US); Ronnie Paskin, Ft. Lauderdale, FL (US); Shawn Stewart, Wake Forest, NC (US)

(73) Assignee: CBS Interactive, Inc., New York, NY (US)

(*) Notice: Subject to any disclaimer, the term of this patent is extended or adjusted under 35 U.S.C. 154(b) by 307 days.

(21) Appl. No.: 13/683,548

(22) Filed: Nov. 21, 2012

(65) Prior Publication Data

US 2014/0142921 A1    May 22, 2014

(51) Int. Cl.
  *G06F 17/00*   (2006.01)
  *G06N 5/00*    (2006.01)
  *G06F 17/28*   (2006.01)
  *G06Q 10/00*   (2012.01)

(52) U.S. Cl.
  CPC ............ *G06F 17/2881* (2013.01); *G06Q 10/00* (2013.01)
  USPC .......................................................... 706/45

(58) Field of Classification Search
  None
  See application file for complete search history.

(56) References Cited

U.S. PATENT DOCUMENTS

| | | | | |
|---|---|---|---|---|
| 8,095,400 B2* | 1/2012 | Herde et al. | | 705/5 |
| 8,234,135 B2* | 7/2012 | Herde et al. | | 705/5 |
| 8,788,927 B2* | 7/2014 | Gleadall et al. | | 715/208 |
| 2014/0019542 A1* | 1/2014 | Rao et al. | | 709/204 |
| 2014/0120511 A1* | 5/2014 | Hall | | 434/350 |
| 2014/0142921 A1* | 5/2014 | Gleadall et al. | | 704/9 |

OTHER PUBLICATIONS

A Review of Anomaly Detection in Automated Surveillance Sodemann, A.A. ; Ross, M.P. ; Borghetti, B.J. Systems, Man, and Cybernetics, Part C: Applications and Reviews, IEEE Transactions on vol. 42 , Issue: 6 DOI: 10.1109/TSMCC.2012.2215319 Publication Year: 2012 , pp. 1257-1272.*

Machine Recognition of Human Activities: A Survey, Turaga, P. ; Chellappa, R. ; Subrahmanian, V.S. ; Udrea, O. Circuits and Systems for Video Technology, IEEE Transactions on vol. 18 , Issue: 11 DOI: 10.1109/TCSVT.2008.2005594 Publication Year: 2008 , pp. 1473-1488.*

* cited by examiner

*Primary Examiner* — Michael B Holmes
(74) *Attorney, Agent, or Firm* — Kacvinsky Daisak Bluni PLLC

(57) ABSTRACT

Various embodiments are generally directed to automated searching and comparison of game statistics to identify, rank and present statistically significant events related to game play during and/or after a game in automatically generated sentences. An apparatus comprises a processor circuit and storage storing instructions operative on the processor circuit to receive signals conveying a first set of statistical information closely related to play of a first game; search the first set of statistical information for a first set of statistical anomalies; and in response to the first set of statistical anomalies comprising an insufficient number of statistical anomalies, search a second set of statistical information less closely related to play of the first game for a second set of statistical anomalies, and transmit a multitude of sentences describing statistical anomalies of the first and second sets of statistical anomalies to a computing device. Other embodiments are described and claimed herein.

32 Claims, 12 Drawing Sheets

AUTOMATED STATISTICS CONTENT PREPARATION

BACKGROUND

Presentations of statistical data concerning the performance of players and/or teams are often desired during and following a presentation of a sporting event (e.g., a visual presentation on a television, a smart phone, etc.) such as football, baseball, soccer, basketball, hockey, golf, etc. However, combing through decades of a history of game statistics, as well as deriving new statistics as game play is ongoing, are both time consuming tasks that often cannot be completed soon enough to effectively enable either meaningful commentary during game play or meaningful review of highlights of that game immediately after it has ended.

Often, multiple hours of time following end of play of a particular game must be given to expert individuals who are assigned either to review a history of game play in a given sport to locate statistical information that is in some way related to that particular game or to complete a review of game play of that particular game to spot statistically significant events that occurred within that particular game. Indeed, it is often hoped that those expert individuals will be able, themselves, to remember statistically significant historical events in game play related to particular players and/or teams as a means to forego having to search for such historical events, and thereby reduce the overall amount of time required to perform such historical research.

This inability to complete such work more quickly effectively results in post-game commentary that must be delivered hours after the game it relates to is over, when audience interest in any commentary of that game has diminished due simply to the passage of time. Indeed, it is not uncommon for commentary concerning an earlier game to be presented at a time immediately following the end of a later game such that an audience that has just viewed the later game is presented with commentary about an earlier game that they may very well have not seen.

It is with respect to these and other considerations that the techniques described herein are needed.

DETAILED DESCRIPTION

Figure 1:
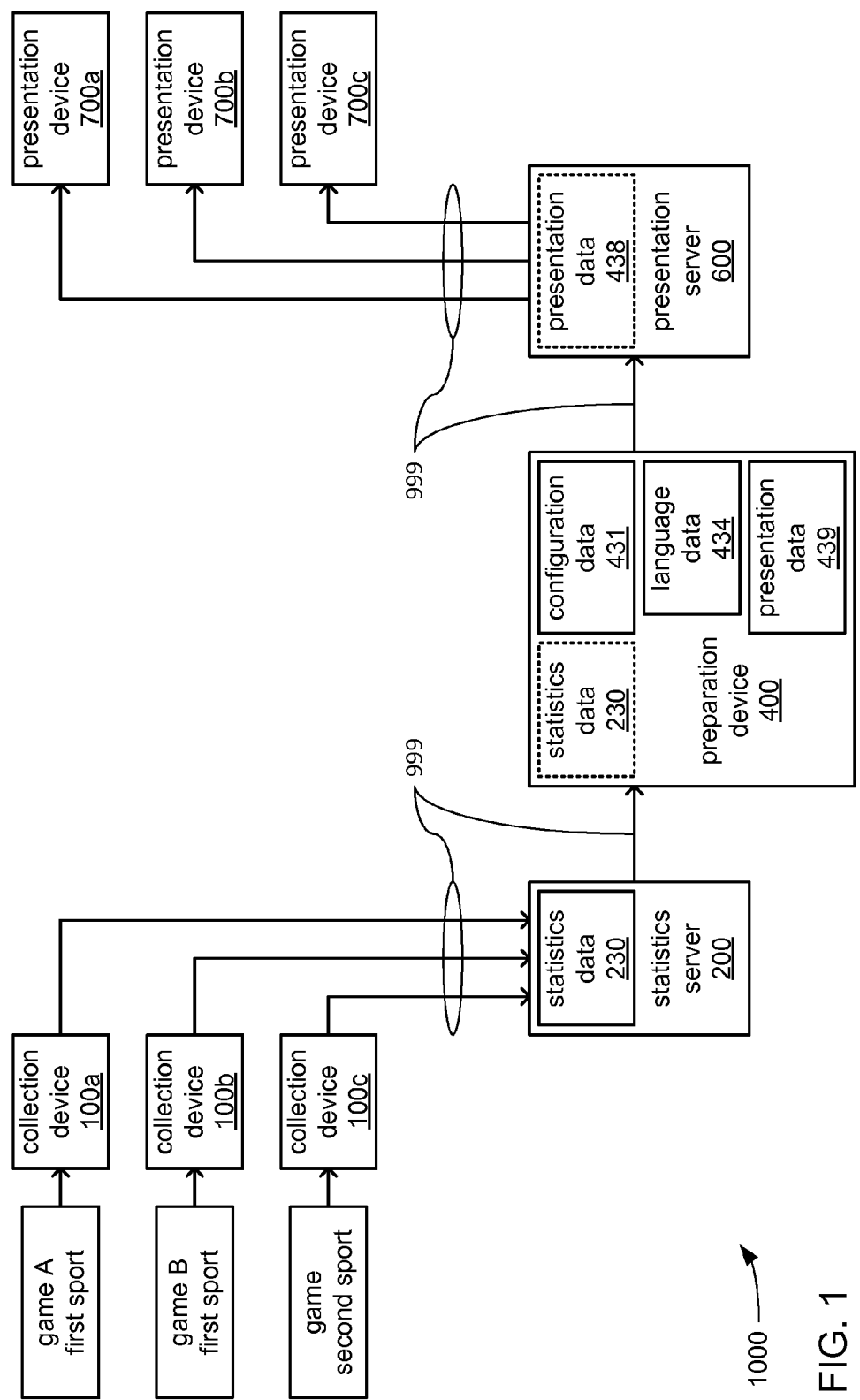
FIG. 1 illustrates a first embodiment of interaction among computing devices.

Various embodiments are generally directed to automated searching and comparison of game statistics to identify, rank and present statistically significant events related to game play during and/or after a game in automatically generated sentences. Some embodiments are particularly directed to automated search and presentation of statistically significant information regarding game play in textual form presented visually and/or aurally to an audience of consumers of information concerning the game.

More specifically, as a game is played, each play of the game generates statistical information that is collected by a collection device and is added to a statistics data that also comprises statistical information related to the same players and/or teams that are playing in the game, related more generally to the sport of the game, and/or related to other games in the same sport. During and/or following play of the game, a preparation device searches the statistics data, making comparisons among statistics to identify a selected quantity of statistically significant anomalies related to the game to selected varying degrees. These anomalies are ranked by the preparation device based at least on their degree of statistical significance. As game play continues and/or following game play, the preparation device automatically forms sentences describing these anomalies in a selected language using a language data comprising rules of sentence structure and from which various words are randomly selected. These sentences are automatically formatted to fit various data formatting requirements for transmission to various types of presentation device during and/or following play of the game, creating a presentation data. The presentation devices may be in the possession of consumers and directly present the presentation data to them, and/or may be in the possession of professional presenters who use the presentation data therefrom as a basis of a presentation they provide to consumers.

As will be explained in greater detail, the preparation device retrieves a configuration data specifying a prioritization of types of anomalies to search for, specifies one or more thresholds of statistical significance, one or more quantities of statistically significant anomalies to search for, and/or specifies one or more languages in which to automatically form sentences. It is envisioned that statistically significant anomalies more closely related to the statistical information received from the play of a particular game will be given higher priority than statistically significant anomalies having a more tangential or remote relationship to that game.

An apparatus comprises a processor circuit and storage storing instructions operative on the processor circuit to receive signals conveying a first set of statistical information closely related to play of a first game; search the first set of statistical information for a first set of statistical anomalies; and in response to the first set of statistical anomalies comprising an insufficient number of statistical anomalies, search a second set of statistical information less closely related to play of the first game for a second set of statistical anomalies, and transmit a multitude of sentences describing statistical anomalies (or data taking other forms to describe statistical anomalies, such as equations, symbolic logical representations, mathematical representations, etc.) of the first and second sets of statistical anomalies to a computing device. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a statistics content preparation system 1000 comprising one or more of collection devices 100a, 100b and 100c; a statistics server 200; a preparation device 400; a presentation server 600; and presentation devices 700a, 700b and 700c. Each of the computing devices 100a-c, 200, 400, 600 and 700a-c may be any of a variety of types of computing device, including without limitation, a desktop computer system, a data entry terminal, a laptop computer, a netbook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc. As depicted, the computing devices 100a-c, 200, 400, 600 and 700a-c exchange signals concerning statistical data related to one or more games of one or more sports through portions of at least one network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

As depicted, each of the collection devices 100a-c receives statistical information concerning plays occurring in various games in differing sports. Specifically, the collection devices 100a and 100b collect statistical information from the play of games A and B, respectively, of the same first sport, while the collection device 100c collects statistical information from the play of a game of a second sport. As those familiar with the work of covering sporting events will readily recognize, the typically seasonal nature of sporting events often results in multiple games for the same sport occurring at overlapping times on the same day. Further, the typical preference to hold various games during nights, weekends and holidays to enable larger audiences to attend games in person sometimes results in games of entirely different sports occurring at overlapping times on the same day. Thus, the allocation of collection devices 100a-c among different games in FIG. 1 is a depiction of an example in recognition of the possibility of simultaneous play of multiple games. As play of their corresponding ones of these games continues and/or at the conclusion of such play, each of the collection devices 100a-c provides their statistical information to the statistics server 200 via the network 999, which stores all of this statistical information as the statistics data 230.

While these various games are in play and/or following the end of play of each of these various games, the preparation device 400 receives the statistics data 230 from the statistics server 200 and searches the statistics data 230, making comparisons among statistics to identify statistically significant anomalies to an extent dictated by a configuration data 431. Also, while these various games are in play and/or following the end of play of each of these various games, the preparation device 400 automatically generates sentences that describe the statistically significant anomalies that have been identified in textual form for presentation to consumers in language(s) specified by the configuration data 431 and using syntax rules and/or randomly selected vocabulary provided in a language data 434. Further, the preparation device 400 formats each of the automatically generated sentences into machine-readable format(s) specified by the configuration data 431 that are appropriate for transmission to one more types of presentation device, and stores them as the presentation data 438. The configuration data 431 specifies one or more of a desired quantity of statistically significant anomalies to be identified, a desired quantitative threshold of statistical significance that an identified anomaly must meet, aspects of the relationship of each identified statistical anomaly to the play of a particular game, one or more languages in which sentences are to be automatically created, one or more machine-readable formats into which the automatically created sentences are to be formatted, etc. The preparation device 400 may receive the configuration data 431 via signals transmitted by another computing device via the network 999, via operation of the controls 420 by a member of personnel associated with an organization creating and/or providing commentary concerning sporting events (such that the preparation device 400 receives signals conveying the configuration data 431 as a result of operation of the controls 420), or via a removable storage medium coupled to the preparation device 400 via a disk drive or other component of the storage 460 that accesses the contents of removable storage media. Organizations creating and/or providing commentary concerning sporting events include, and are not limited to, broadcasting companies transmitting broadcasts that includes such commentary via open air radio frequency signals, cable companies transmitting such broadcasts via electrically and/or optically conductive cabling, and online companies transmitting such commentary as audio and/or video streams (or still other types of data streams) via the Internet.

The preparation device 400 provides copies of the presentation data 438 to the presentation server 600, which in turn, distributes those copies of the presentation data 438 to one or more of the presentation devices 700a-c via the network 999. One or more of the presentation devices 700a-c may be consumer-oriented computing devices by which consumers may directly watch, listen to or otherwise follow the play of one or more games, such as an interactive television, a portable computing device carried on their person, a desktop computer system, etc. Alternatively or additionally, one or more of the presentation devices 700a-c may be studio-based devices by which content for a television, radio, Internet streaming or other presentation to consumers is generated, such as a computing device employed for editing purposes, or a computing device positioned on a set or in a recording room to present information for use by a professional presenter who verbally and/or visually provides game-related information to consumers in a broadcast.

It should be noted that at least the collection of statistical information of specific games, the search for and ranking of statistical anomalies, and the generation and formatting of sentences describing those statistical anomalies may all be carried out while a game is in play, regardless of whether those sentences will be transmitted and presented while the game is in play. Where a presentation of those sentences is to be done only after a game has ended (e.g., in a post-game review program presented in a broadcast), one or more of the collecting, searching, ranking, sentence generation and formatting either may be performed while a game is still in progress as part of preparing in advance or may not be performed until the game is concluded. However, where presentation of sentences describing such statistical anomalies is to occur concurrently with game play, then all of the collecting, searching, ranking, sentence generation and formatting must be performed as game play is still under way. Thus, the statistics content preparation system 1000 may be operated in one of at least two possible modes: a first mode in which presentation occurs only following the end of a game such that any of collection through formatting may be done either during or following a game, or a second mode in which presentation occurs during game play such that all of collection through formatting must also be done during game play to generate the sentences to be presented during game play.

Figure 2:
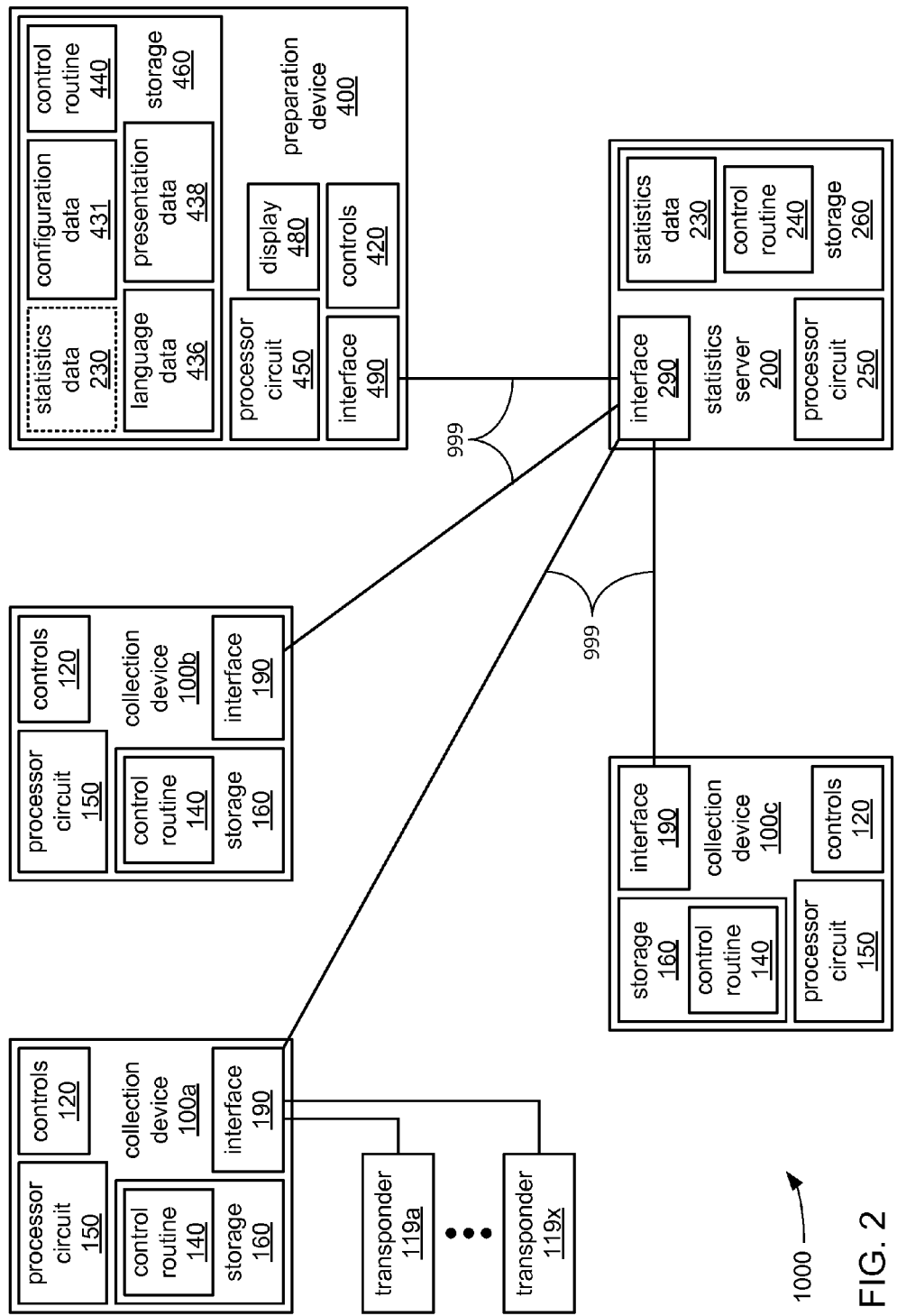
FIG. 2 illustrates a portion of the embodiment of FIG. 1.
Figure 3:
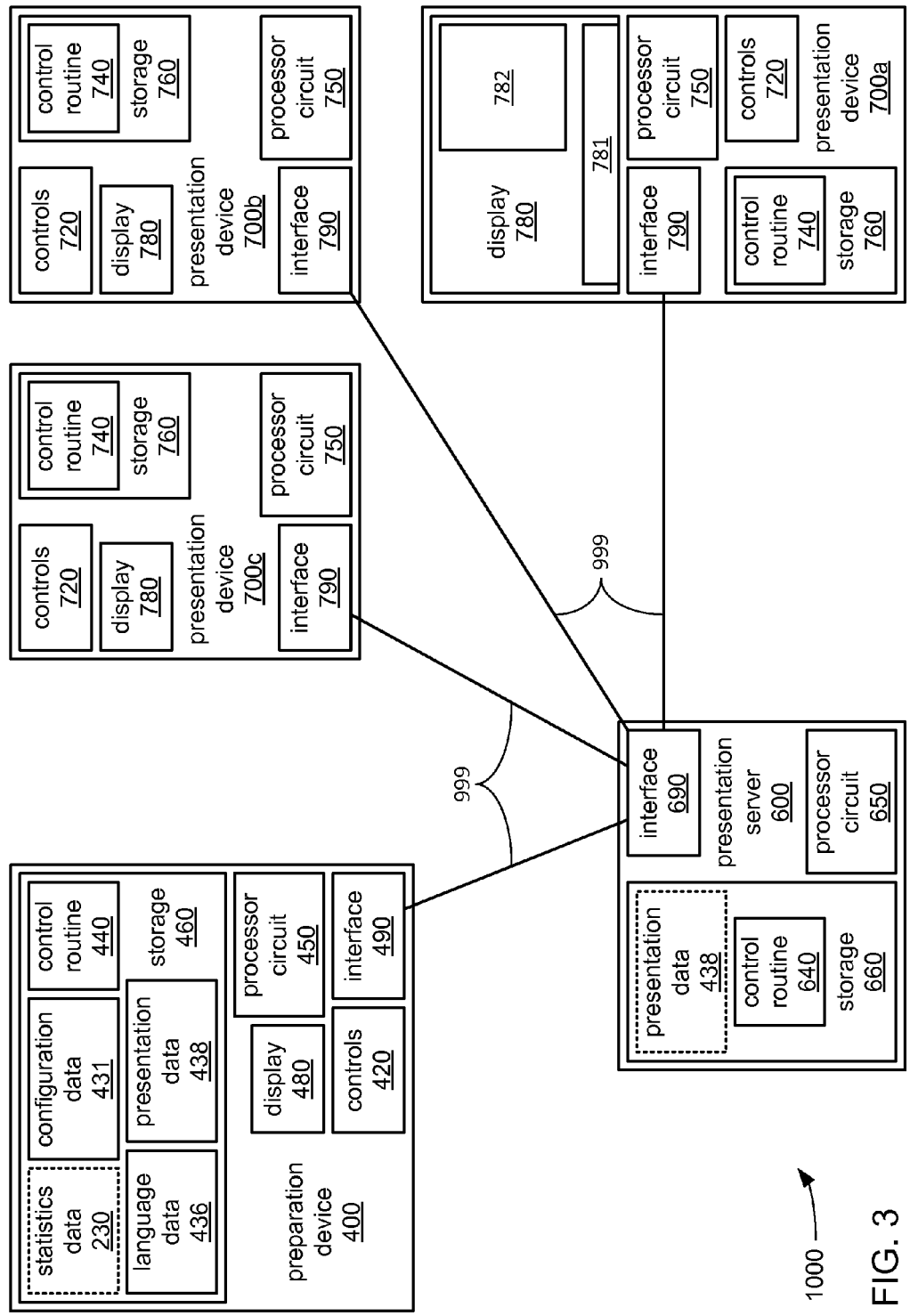
FIG. 3 illustrates a portion of the embodiment of FIG. 1.

FIGS. 2 and 3, taken together, depict the statistics content preparation system 1000 in greater detail. FIG. 2 depicts greater detail of aspects of collecting the statistical information from one or more games, storing those pieces of statistical information as a statistics data 230, and searching the statistics data 230 for anomalies. FIG. 3 depicts greater detail of aspects of disseminating copies of the presentation data formatted in various ways for presentation in various ways to consumers of the presentation data.

In various embodiments, each of the collection devices 100a-c comprises a storage 160 storing a control routine 140, a processor circuit 150, controls 120 and an interface 190 coupling each of the collection devices 100a-c to the network 999. In executing a sequence of instructions of at least the control routine 140, the processor circuit 150 of each of the collection devices 100a-c is caused to await receipt of signals indicative of statistical information associated with the play of their associated game. The signals awaited may be signals indicative of operation of the controls 120 (e.g., keys of a keyboard or keypad, a mouse, a touchpad, a touchscreen, etc.) by a person monitoring a game and thereby entering statistical information into the one of the collection devices 100 associated with that game. In other words, the signals awaited may be indicative of manual entry of statistical information arising from each play of a game in progress. Alternatively or additionally, and as depicted with regard to the collection device 100a, the signals awaited may be signals received by a component of the interface 190 from one or more of the transponders 119a-x disposed about various locations related to a game in progress. More specifically, in some games, transponders are carried by players, racing vehicles, locations of goals, etc. in a game to enable automated tracking of movement and/or to detect successful scoring.

The exact nature of the statistical information collected by one of the collection devices 100a-c depends on the type of game played. Thus, the statistical information could include one or more of distances run, bicycled, driven, jumped, thrown, etc. by particular players; distances by which a ball is moved in a given direction across a field; goals scored; fastest times; number of laps and/or pit stops; number of timeouts and/or penalty points; number of holes-in-one and/or under par; number of swings, misses, balls, strikes, spares, fouls, home runs and/or outs; fastest pitch and/or longest kick; etc. Each of the collection devices 100a-b signals the statistics server 200 with an indication of the current state of play of their associated game (e.g., ongoing, ended, postponed, etc.) as well as with statistical information.

In various embodiments, the statistics server 200 (if present) comprises a storage 260 storing a control routine 240 and the statistics data 230, a processor circuit 250, and an interface 290 coupling the statistics server 200 to the network 999. In executing a sequence of instructions of at least the control routine 240, the processor circuit 250 is caused to operate the interface 290 to receive signals conveying statistical information and indications of current state of play of various games from one or more of the collection devices 100a-c via the network 999. The processor circuit 250 is caused to store the received statistical information concerning the various games as part of the statistics data 230. The statistics data 230 is organized to correlate games to individual players and/or teams; locations and/or dates played; types of plays (e.g., runs, passes, punts, kicks, dunks, etc.); official calls made (e.g., fouls, time-outs, penalties, etc.); etc. The processor circuit 250 then operates the interface 290 to transmit the statistics data 230 and indications of the current state of play of various games to the preparation device 400.

In various embodiments, the presentation server 600 (if present) comprises a storage 660 storing a control routine 640 and the presentation data 438, a processor circuit 650, and an interface 690 coupling the statistics server 600 to the network 999. In executing a sequence of instructions of at least the control routine 640, the processor circuit 650 is caused to operate the interface 690 to receive signals conveying copies of the presentation data 438 from the preparation device 400, and to store those copies in the storage 660. As previously discussed, the presentation data 438 comprises automatically generated sentences describing statistical anomalies of one or more games in textual form, and automatically formatted into various machine-readable formats appropriate for transmission to various types of presentation device. The processor circuit 650 is also caused to transmit one or more of the automatically generated sentences of which the presentation data 438 is composed to various presentation devices, such as the presentation device 700a-c, via the network 999.

In various embodiments, each of the presentation devices 700a-c comprises a storage 760 storing a control routine 740, a processor circuit 750, controls 720, a display 780, and an interface 790 coupling each of the collection devices 700a-c to the network 999. In executing a sequence of instructions of at least the control routine 740, the processor circuit 750 of each of the presentation devices 700a-c is caused to await receipt of signals conveying at least a subset of the automatically generated sentences of the presentation data 438 via the network 999, and to present those received sentences.

Depending on various aspects of each of the presentation devices 700a-c, the presentation may be visual or aural, and/or may require those sentences to be formatted into any of a variety of device-specific machine-readable formats.

By way of example, where one of the presentation devices 700a-c is positioned within a studio (for a broadcasting company, a cable company, an online streaming company, etc.) for use by a sports commentator or other presentation professional describing a game in a broadcast and/or Internet data stream, that particular one of the presentation devices 700a-c may be a teleprompter device visually presenting the automatically generated sentences on the display 780 in a line of sight of that presentation professional to be read during the broadcast. Alternatively, that one of the presentation devices 700a-c may be a desktop or portable computer system visually presenting the automatically generated sentences on the display 780 to an editor at a broadcast studio who reviews the automatically generated sentences to choose from among them the content that is to be presented in an upcoming broadcast. It should be noted that such sentences may be accompanied by graphs, charts and/or other visual aids that visually present the statistical anomalies described in one or more of the sentences.

By way of another example, where one of the presentation devices 700a-c is a computing device in the possession of a consumer receiving a broadcast of sports-related information, the particular type of computing device may correspond to a particular network protocol that, in turn, dictates the use of a particular machine-readable format in which the automatically generated sentences must be transmitted via the network 999. Specifically, where that one of the presentation devices 700a-c is computer system incorporating a web browser by which its user views content provided by other computing devices across the network 999 via the display 780, the automatically generated sentences may be formatted into HTML (hypertext markup language), XML (extensible markup language), SGML (standard generalized markup language), PDF (portable data format), JSON (JavaScript object notation), etc. Alternatively, where that one of the presentation devices 700a-c is a handheld computing device such as a smart phone having a relatively small form of the display 780, the automatically generated sentences may be formatted for transmission via the network 999 as SMS (short message service) or IM (instant messenger) text messages more appropriate for a smaller display.

By way of still another example, one of the presentation devices 700a-c may be a more stationary content viewing device such as an interactive television or other computing device in which the display 780 is sufficiently large as to permit both play of a game to be viewed and the automatically generated sentences to be read simultaneously. This particular example is best illustrated by the more detailed depiction of the presentation device 700a in FIG. 3, in which the display 780 is depicted as having defined thereon two possible display regions 781 and 782 on which such text may be display alongside a visual presentation of the game to which such text relates elsewhere on the display 780, and possibly accompanied by verbal descriptions of the play in progress by a professional presenter through a speaker (not shown). The automatically generated sentences may be visually presented in the display region 781 in a continuously horizontally scrolling manner commonly referred to as a "crawler" or "ticker" (either along the bottom edge of the display 780, as shown, or along the top edge thereof). Alternatively, the automatically generated sentences may be visually presented in a "pop-up" or "windowed" manner in the display region 782 that may be positioned towards one side of the display (possibly with the game play visually presented in a "windowed" manner towards the opposite side) or that may be positioned towards one corner of the display to minimize the degree to which the view of the game, itself, is obstructed or otherwise hampered.

The presentation device 700a may receive the automatically generated sentences and the video of the game to which they relate as a combined series of transmissions via the network 999 or as separate transmission employing different network protocols via the network 999. In either case, the side-by-side or overlapping positioning of one or the other of the display regions 781 and 782 on the display 780 may be performed by the processor circuit 750, possibly with input from a user of the presentation device 700a via the controls 720 concerning the shape, size and/or positioning of one of these display regions on the display 780. Alternatively, the presentation device 700a may receive the automatically generated sentences via the network 999 while imagery of a game to which they relate may be received entirely separately by the presentation device 700a as a radio frequency transmission via land-based RF broadcast service, satellite transmission service or a cable television service. In such an alternative, the interface 790 comprises both an interface component coupling the presentation device 700a to the network 999 and a radio frequency tuning component to receive the radio frequency transmission of imagery. As still another alternative, the presentation device 700a may receive a radio frequency broadcast of imagery in which images of game play of a game are already combined with visual presentation of the automatically generated text, rather than receiving such text via the network 999, at all.

In various embodiments, the preparation device 400 comprises a storage 460 storing a control routine 440, the statistics data 230, the configuration data 431, the language data 436 and the presentation data 438; a processor circuit 450, controls 420, a display 480, and an interface 490 coupling the statistics server 200 to the network 999 and/or more directly to the statistics server 200 and/or the presentation server 600. It is envisioned that while the statistics server 400 and the presentation server 600 may be coupled to the collection devices 100a-c and the presentation devices 700a-c, respectively, via more distant connections through the network 999 (especially where the network 999 comprises the Internet), it is also envisioned that these two servers may be more closely coupled to the preparation device (e.g., via a relatively higher speed and capacity local network). Alternatively, the preparation device 400 may comprise one or both of these servers such that the preparation device 400 performs the functions of one or both of the statistics server 200 and the presentation server 400, thereby having a more directly coupling to the collection devices 100a-c and/or the presentation devices 700a-c.

In various embodiments, each of the processor circuits 150, 250, 450, 650 and 750 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 260, 460, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 290, 490, 690 and 790 employ any of a wide variety of signaling technologies enabling each of computing devices 100, 200, 400, 600 and 700 to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 250, 450, 650 and 750 (e.g., to implement a protocol stack or other features). Where one or more portions of the network 999 employs electrically and/or optically conductive cabling, corresponding ones of the interfaces 190, 290, 490, 690 and 790 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of the interfaces 190, 290, 490, 690 and 790 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HS-DPA), High Speed Uplink Packet Access (HSUPA), 4G LTE, etc. It should be noted that although each of the interfaces 190, 290, 490, 690 and 790 are depicted as a single block, one or more of these may comprise multiple interfaces that may be based on differing signaling technologies. This may be the case especially where one or more of these interfaces couples corresponding ones of the computing devices 100, 200, 400, 600 and 700 to more than one network, each employing differing communications technologies.

In various embodiments, each of the controls 120, 420 and 720 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. Each of the controls 120, 420 and 720 may comprise manually-operable controls disposed upon a casing of corresponding ones of the computing devices 100, 400 and 700, and/or may comprise manually-operable controls disposed on a separate casing of a physically separate component of corresponding ones of these computing devices (e.g., a remote control coupled to other components via infrared signaling). Alternatively or additionally, the controls 120, 420 and 720 may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 480 and 780 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 100 and 700, or may be disposed on a separate casing of a physically separate component of corresponding ones of these computing devices (e.g., a flat panel monitor coupled to other components via cabling).

Figure 4:
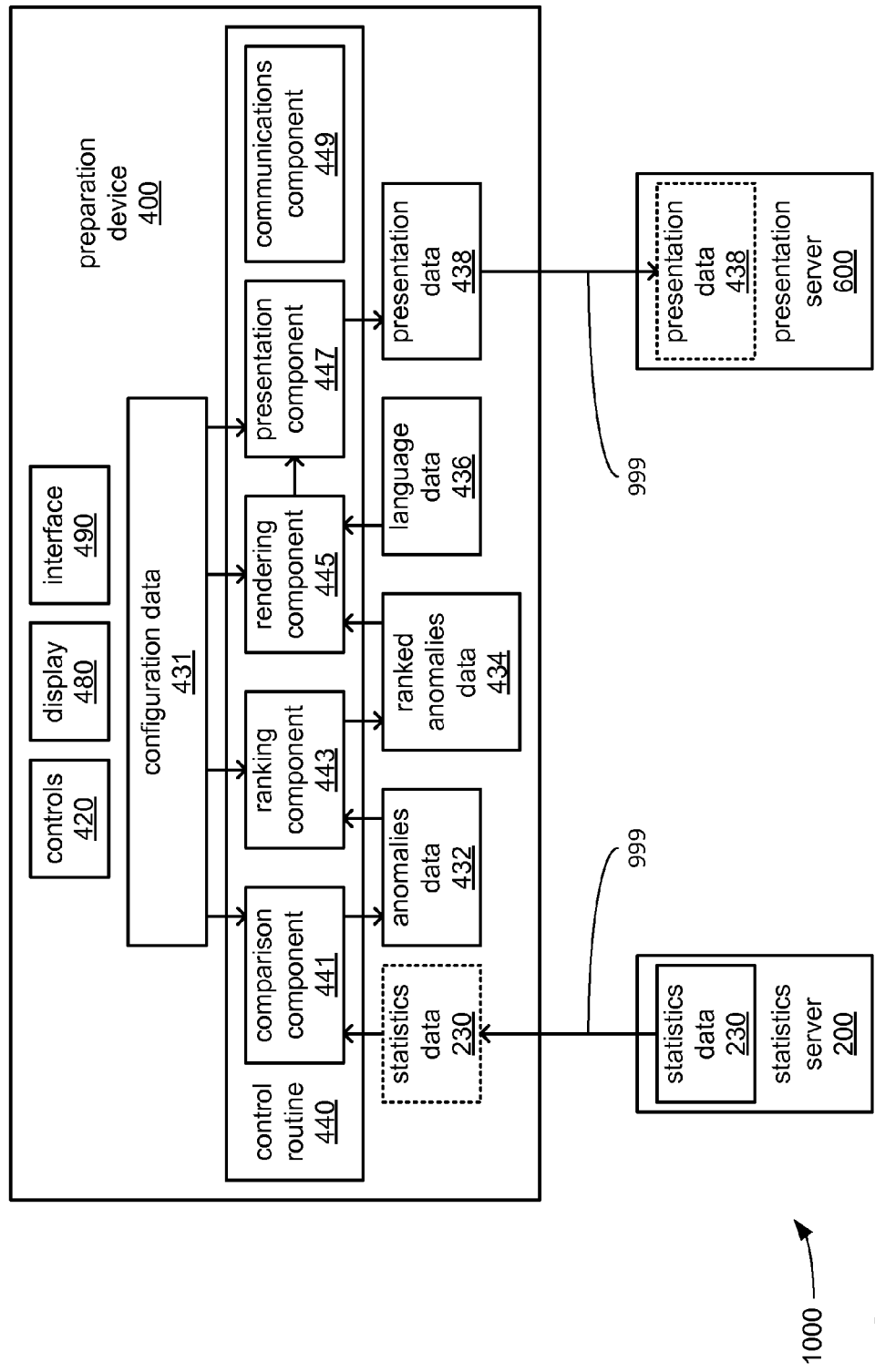
FIG. 4 illustrates a portion of the embodiment of FIG. 1.

FIG. 4 illustrates a block diagram of a portion of the block diagram of FIG. 1 in greater detail. More specifically, aspects of the operating environment of the preparation device 400 in which the processor circuit 450 (shown in FIGS. 2 and 3) is caused by execution of the control routine 440 to perform the aforedescribed functions are depicted. As will be recognized by those skilled in the art, the control routine 440, including the components of which it is composed, is selected to be operative on whatever type of processor or processors that are selected to implement the processor circuit 450.

In various embodiments, the control routine 440 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for the processor circuit 450, including without limitation, Windows™, OS X™, Linux®, or Android OS™. Where one or more device drivers are included, those device drivers may provide support for any of a variety of other components, whether hardware or software components, that comprise the preparation device 400.

The control routine 440 comprises a communications component 449 executable by the processor circuit 450 to operate the interface 490 to transmit and receive signals via the network 999 as has been described. As will be recognized by those skilled in the art, the communications component 449 is selected to be operable with whatever type of interface technology is selected to implement the interface 490. The communications component 449, therefore, causes the processor circuit 450 to operate the interface 490 to receive the statistics data 230 from the statistics server 200 and to transmit the presentation data 438 (or portions thereof) to the presentation server 600. However, as has been discussed, in various possible embodiments, one or both of the statistics server 200 and the presentation server 600 may be incorporated into the preparation device 400. In such embodiments, the collection devices 100a-c and/or the presentation devices 700a-c may be more directly in communication with the preparation device 400 such that the preparation device 400 may directly receive statistical information from game play and/or may directly transmit at last portions of the presentation data 438 (possibly individual ones of the automatically generated sentences thereof).

The control routine 440 comprises a comparison component 441 executable by the processor circuit 450 to cause the processor circuit 450 to employ comparisons among statistics of the statistics data 230 to search for statistical anomalies in accordance with requirements specified by the configuration data 431, and to store statistical anomalies identified as meeting those requirements as an anomalies data 432 stored in the storage 460. The configuration data 431 specifies a number of statistical anomalies desired to be identified that relate to the play of a game, and a threshold of deviation that the statistical anomalies must meet. The threshold may be specified in a unit of standard deviation from a norm of a set of statistical information that will be familiar to those skilled in the art of statistical analysis, e.g., sigma ($\sigma$). As those skilled in the art of statistical analysis will readily recognize, specifying a degree of deviation from a norm of a set of statistical information requires that the set of statistical information be defined such that aspects of the normal distribution of that set of statistical information can be derived, including the standard deviation itself.

The configuration data 431 may also specify a particular order of types of statistical information within the statistics data 230 to be searched that may be prioritized by closeness of association to a particular game. By way of example, the configuration data 431 may specify that highest priority be given to statistical anomalies meeting the specified threshold of deviation that are found within statistical information arising solely from plays made in the game, itself. The next highest priority may be given to statistical anomalies meeting the specified threshold of deviation that are found within statistical information concerning teams and/or individual players playing the game, where that statistical information includes past games played by those teams and/or players. Then, the next highest priority may be given to statistical anomalies meeting the specified threshold of deviation that are found within statistical information concerning the sport to which the game belongs, including other previously played games regardless of what teams and/or players were involved. And then, the next highest priority may be given to statistical anomalies meeting the specified threshold of deviation that are found in sports that may be deemed in some way related to the sport to which the game belongs (for example, where the game is part of major league baseball, a related sport may be minor league baseball). Alternatively or additionally, the next highest priority may be given to statistical anomalies meeting the specified threshold of deviation that are found in games of unrelated sports that are being played on the same day as the particular game (e.g., related to the particular game in a temporal sense) and/or have been played in the same location as the particular game (e.g., related to the particular game in a geographic sense).

In specifying an order of priority of sets of statistical information in which to search for statistical anomalies that starts with statistical information closely related to a particular game before changing to sets of statistical information that are progressively more remote in their relation to the particular game, a presentation of statistical anomalies related to the game will tend to focus first on statistical anomalies arising from that game's play. Where play in a particular game presents a sufficient number of statistical anomalies to meet the number of desired statistical anomalies specified by in the configuration data 431, there may be no need to include the lower prioritized sets of statistical information that are more remotely related to the play of that game, resulting ultimately in a presentation to consumers that is more focused on that game. However, where the play of a particular game proves to be lacking in the generation of a sufficient number of statistical anomalies, then sets of statistical information that are progressively more remote of play of the particular game are included until the desired number of statistical anomalies specified in the configuration data 431 is reached. It should be noted, however, that this is but one example ordering of statistical anomalies, and that the statistical anomalies may be organized and/or prioritized by other criterion. By way of example, it may be that a mixture of statistical anomalies that are both closely related and not closely related to the play of a game may be desired, or it may be that a presentation starting and ending with statistical anomalies less related to game play is desired where statistical anomalies most closely related to game play are presented at a midpoint in that presentation.

The comparison component 441 may cause the processor circuit 450 to perform such searching on a recurring basis as game play of a particular game is still in progress, or following end of play of a particular game, or both. As previously discussed, the statistical information provided by each of the collection devices 100a-c may be accompanied by indications of whether each of the games for which the collection devices 100a-c collect statistical information is still in progress or has concluded, and such indications may be included in the statistics data 230, thereby enabling the comparison component 441 to monitor the current state of each game.

Where searching is caused by the comparison component 441 to occur during game play and where a prioritization of sets of statistical information related to differing degrees to that game is employed, the closeness of relationship of identified anomalies stored as the anomalies data 432 is apt to change over time as the game play continues. More specifically, it is to be expected that there is an initial dearth of statistical information related to play of a game at the time the game commences, and thus, the comparison component 441 is initially caused to search sets of statistical information of the statistics data 230 that are given a lower priority in the configuration data 431. However, as game play progresses such that statistical information related to game play for that game starts to accumulate in the statistics data 230, subsequent searches of the statistics data 230 are apt to focus progressively more on statistical information of the statistics data 230 related to game play, and an increasing number of statistical anomalies related to game play are apt to be identified and included in the anomalies data 432.

The control routine 440 comprises a ranking component 443 executable by the processor circuit 450 to rank statistical anomalies that have been identified by the comparison component 441 and thereby stored as the anomalies data 432 in an order specified by the configuration data 431. The configuration data 431 specifies at least the manner in which identified statistical anomalies from the same set of statistical information are ranked, and it may be deemed desirable for that order of ranking to be determined by degree of deviation from a statistical norm in which statistical anomalies having a greater degree of deviation are ranked more highly than others. However, where the anomalies data 432 might include statistical anomalies from different sets of statistical information that have been given different relative priorities (as has been discussed above, at length), then the ranking component 443 may also rank identified statistical anomalies in the anomalies data 432 into groups of statistical anomalies organized by such relative priorities. Thus, the identified statistical anomalies stored as part of the anomalies data 432 may first be ranked by the closeness of relationship to game play of a particular game of the sets of statistical information in which they were found, and then by their degree of deviation within each of those ranked groups. The ranked statistical anomalies are then stored in ranked order as a ranked anomalies data 434.

The control routine 440 comprises a rendering component 445 executable by the processor circuit 450 to automatically generate sentences incorporating each of the statistical anomalies that have been ranked and stored in the ranked anomalies data 434. In automatically generating these sentences, the rendering component 445 employs vocabulary and syntactic rules for one or more languages stored in the language data 436. The configuration data 431 specifies the language(s) used in generating these sentences. The language data 436 comprises a vocabulary of verbs and other words and/or clauses that are randomly selected by the rendering component 445 in automatically generating sentences. This random selection of words aids in providing some degree of variety in the choice of words employed in forming sentences. For example, instead of repeatedly using the word "thrown" each time a sentence is formed describing a throw of a football by a quarterback to a receiver, various synonyms may be randomly selected, such as "tossed" or "launched" or "air-mailed" to the receiver. Further, the selection of synonyms may be partially based on the degree of deviation of the statistical anomaly involved. For example, more colorful choices of words such as "launched" or "air-mailed" may be used where a quarterback has thrown a football a sufficiently lengthy distance to a receiver that the length is a statistical anomaly with a high deviation from the norm. Alternatively or additionally, such random selection may be modified with the use of weighting values that can be adjusted to tend to cause certain words to be more likely to be randomly selected than others. Also alternatively or additionally, such random selection may be modified through the use of variables that track how far long ago each of various words were last used to avoid allowing instances of a given word being randomly selected for use too frequently (possibly by adjusting the weighting values that are used to cause some words to be randomly selected more often than others).

The control routine 440 comprises a presentation component 447 executable by the processor circuit 450 to automatically format the sentences automatically generated by the rendering component 445 into one or more machine-readable formats appropriate for transmission to other computing devices, to store the formatted sentences as the presentation data 438, and to provide at least a portion of the presentation data 438 to other computing devices at appropriate times. As previously discussed, the automatically generated sentences setting forth statistical anomalies as text may require formatting into various machine-readable formats depending on the types of computing devices to which they are transmitted and/or the network protocols employed in those transmissions. Where presentations concerning a particular game are made during game play, the processor circuit 450 is caused by the presentation component 447 to recurringly operate the interface 490 to recurringly transmit portions of the presentation data 438 to one or more other computing devices during game play. Where a presentation concerning a particular game is made following game play, the processor circuit 450 is caused to operate the interface 490 to provide some or all of the presentation data 438 to one or more other computing devices, possibly to enable professional presenters to employ the automatically generated sentences incorporating the identified and ranked anomalies in providing a post-game review and commentary to consumers.

Where it is specified in the configuration data 431 that statistical anomalies may be searched for in statistical information that includes other games, such that the statistical anomalies for which sentences may be automatically generated may refer to other games, the presentation component 447 may embed information providing a mechanism by which consumers may switch what they view and/or what they receive automatically generated sentences about to one of those other games. More specifically, where the configuration data 431 specifies that the automatically generated sentences are to be formatted into an machine-readable format into which links, tags or similar data may be embedded, such as any of a variety of markup languages (e.g., HTML, SGML, XML, etc.), the presentation component may so embed such data. Such embedded data enables a consumer receiving the automatically generated sentences via one of the presentation devices 700a-c to be visually presented with a selectable object as part of the presentation of those sentences that the consumer may select by operating the controls 720 to cause that one of the presentation device 700a-c to transmit a signal via the network 999 to request that automatically generated sentences and/or other content related to a different game be provided to it.

Figure 5:
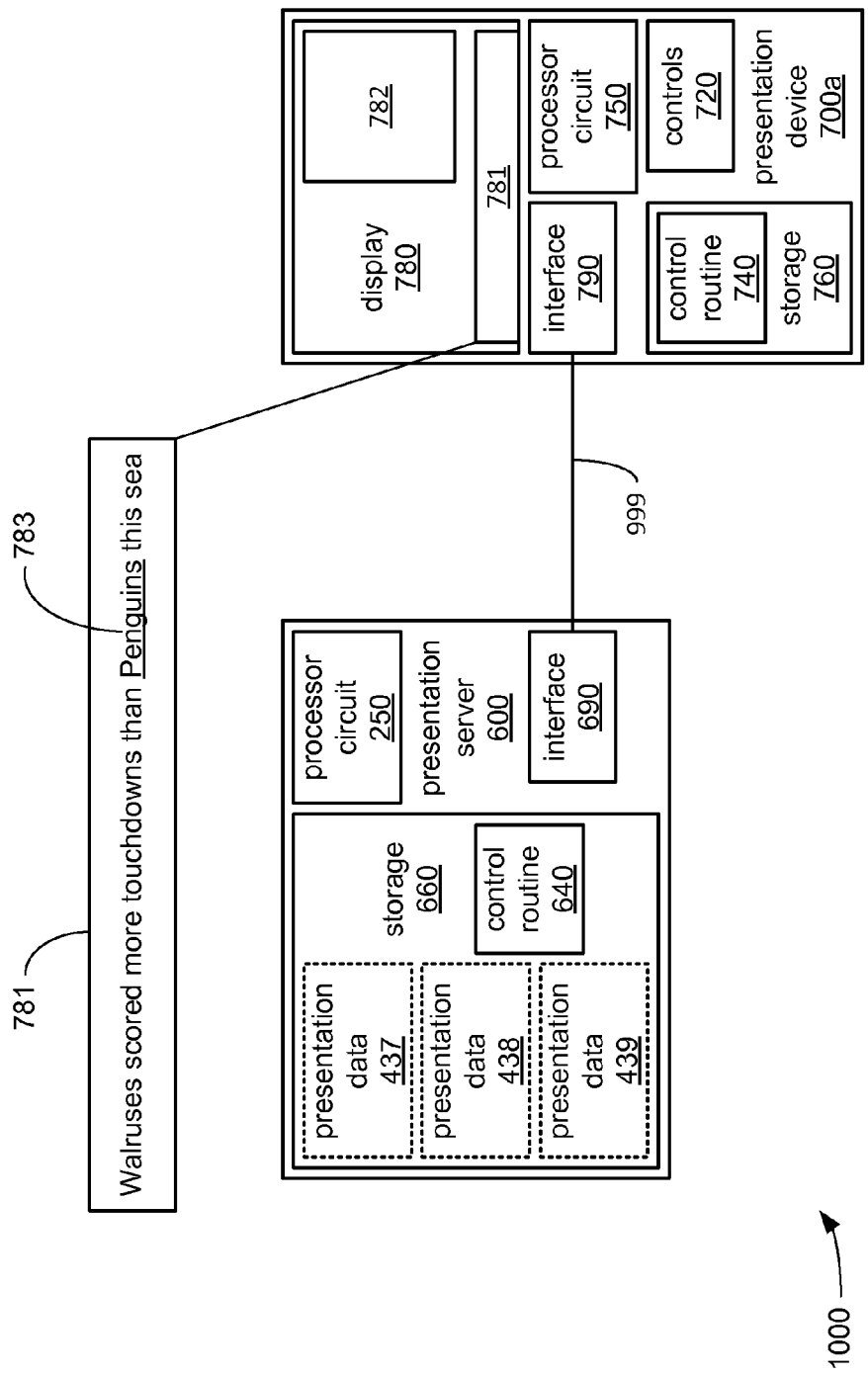
FIG. 5 illustrates a second embodiment of interaction among computing devices.

FIG. 5 illustrates such use of such embedded data, depicting an example of an alternate variant of the presentation server 600 in which other presentation data 437 and 439 are stored along with the presentation data 438 for transmission via the network 999 to the presentation device 700a. A consumer visually presented with automatically generated sentences conveying statistical anomalies concerning a game associated with the presentation data 438 as a "ticker" or "crawler" of text in the display region 781 (or possibly as a window in the display region 782) may be visually presented with a selectable object within that text that the user is able to select through operation of the controls 720 (e.g., a portion of the text 783 that is underlined as a way to indicate that it is a selectable object). The processor circuit 750 of the presentation device 700a may be caused by the control routine 740 to monitor the controls 720 for receipt of a signal therefrom that is indicative of that consumer making that selection (e.g., selecting that selectable portion of text 783). In response to the receipt of such signals, the processor circuit 750 may then be caused to operate the interface 790 to signal the presentation server 600 to cease sending automatically generated sentences of the presentation data 438, and instead, to send automatically generated sentences of one or the other of the presentation data 437 or 439 conveying statistical anomalies of a different game.

In one example embodiment, game A of the first sport (referring to FIG. 1), is in progress, and is to be discussed in a broadcast commentary by a professional presenter immediately following its conclusion. As game A is played, the collection device 100a receives signals conveying statistical information concerning game play (e.g., distances run, thrown, kicked or jumped; number of laps, goals, balls, hits, strikes, fouls or home runs; fastest time or time remaining, etc.). These signals may emanate from personnel operating the controls 120 (e.g., one or more of a keyboard, keypad, mouse, touchpad, touchscreen, etc.) to manually enter statistical information into the collection device 100a. Alternatively or additionally, these signals may be received via the interface 190 from the transponders 119a-x disposed on individual players, vehicles, goal locations, etc. in the playing field that automatically provide the collection device 100a with statistical information arising from the transponders 119a-x tracking movement associated with game play, scores made at goal locations (e.g., hoops, end zones, goal posts, goal nets), etc. The processor circuit 150 is caused to operate the interface 190 to signal the statistics server 200 to transmit this received statistical information to the statistics server 200 via the network 999 along with an indication of the current state of play of game A (e.g., whether game A is still in progress or has ended).

The statistics server 200 receives these transmissions of the collection device 100a providing the statistical information related to game play of game A, and adds the statistical information, as it is received by the statistics server 200, to the statistics data 200. As previously discussed, the statistics data 200 comprises statistical information received from numerous games spanning a considerable period of time, and may also comprise statistical information from games of different sports. Again, in alternate variants, the functions of the statistics server 200 may be performed by the preparation device 400, in which case, the preparation device 400 receives the statistical information transmitted by the collection device 100a, more directly.

Regardless of whether the statistics data 230 is created by the statistics server 200 and conveyed to the preparation device 400, or the preparation device 400 creates the statistics data 230 directly from direct receipt of statistical information from the collection device 100a, the preparation device 400 awaits a signal indicating that game play of game A has ended. Upon receiving that signal, the processor circuit 450 of the preparation device 400 searches the statistics data 230 to identify statistical anomalies in statistics information relating to game A that meet requirements specified in the configuration data 431. As previously discussed, the configuration data 431 specifies various requirements of this search, such as one or more of what game the search is related to, a threshold of deviation that statistical anomalies must meet, a desired number of anomalies to be identified, whether the search is performed during or following a game (depending on whether commentary about statistical anomalies is desired during or only after a game), a prioritized list of sets of statistical information within the statistics data 230 to be searched in a particular order until the desired number of statistical anomalies meeting the threshold are identified (possibly prioritized from most related to game A to least related), what language(s) to use in the sentences generated concerning the statistical anomalies, and what machine-readable formats the sentences should be formatted into for transmission to other computing devices.

Presuming that the configuration data 431 does specify a prioritized order of sets of statistical information to be searched in the statistics data 230 that starts with statistical information related solely to game play of game A and then progresses to other sets of statistical information that are progressively more remote in relation to game A, then the processor circuit 450 is caused to initially search for and identify one or more statistical anomalies in the statistics data 230 that relate solely to game play of game A and that meet a threshold of deviation presumably specified by the configuration data 431 (e.g., $2\sigma$, $3\sigma$, etc.). However, presuming that these statistical anomalies found in statistical information related solely to the play of game A are not enough to meet a number of statistical anomalies presumably specified in the configuration data 431, the processor circuit 450 then widens the search to include statistical information bearing a relationship to game A, but not focused solely on the play of game A, such as statistical information concerning the teams and/or players that played in game A where such statistical information including plays made by those teams and/or players in other games, as well as in game A. If this wider search still does not provide enough statistical anomalies to meet the number specified by the configuration data 431, then the processor circuit 450 is cause to widen the search again, and perhaps still again, encompassing ever lower priority sets of statistical information within the statistics data 230 until enough statistical anomalies are identified. In this progressive widening to sets of statistical information that are ever more remote in relation to game A, the search may eventually need to include statistical information from all games that have occurred in the sport to which game A belongs, and if that proves insufficient, then the search may be widened again to include statistical information related to other games that happened to be played at the same location as game A and/or on the same day (or at the same time) as game A. Thus, if the play of game A provides too few statistical anomalies meeting the specified threshold, then the search may be widened to include statistical anomalies of game B collected by the collection device 100b, which may have been played on the same day or earlier in the day at the same location as game A. It may also be that the search is widened to include statistical anomalies of the game of the second sport collected by the collection device 100c, which despite being a game of a different sport, may have occurred on the same day or have been played in the same location as game A.

With the specified number of statistical anomalies identified, the processor circuit 450 is further caused to rank them. The configuration data 431 may specify any of various possible approaches to ranking. It is envisioned that the identified statistical anomalies may be ranked in order from those having the greatest deviation from a norm to those having the least. However, where lower priority sets of statistical information within the statistics data 230 had to be searched to identify a sufficient number of statistical anomalies, the identified statistical anomalies may additionally or alternatively be ranked in order of the closeness of their relationship to game A.

With the identified statistical anomalies ranked, the processor circuit 450 is caused to generate sentences stating or describing these statistical anomalies in textual form in whatever language(s) are specified by the configuration data 431. In so doing, the processor circuit 450 employs vocabulary and syntactic rules provided by the language data 436 for each specified language, including randomly selecting verbs and/or other words in forming each sentence. Following this automated generation of these sentences, the processor circuit 450 is further caused to format each of these sentences into one or more machine-readable formats appropriate for transmission to one or more of the presentation devices 700a-c, and to store the formatted sentences as the presentation data 438. Then, the processor circuit 450 is caused to transmit the presentation data 438 to the presentation server 600. Again, in alternate variants, the functions of the presentation server 600 in transmitting some or all of the presentation data 438 to one or more of the presentation devices 700*a-c* may be performed by the preparation device 400, in which case, the preparation device 400 performs such transmissions to one or more of the presentation devices 700*a-c*, more directly.

Regardless of whether it is the presentation server 600 or the preparation device 400 that transmits some or all of the presentation data 438 to one or more of the presentation devices 700*a-c*, in this example, the presentation data 438 is received by at least the presentation device 700*a* and is presented by the presentation device 700*a* to a member of the studio personnel working at a broadcast studio. It may be that this member of the studio personnel is an editor who reviews these automatically generated sentences in contemplation of making changes before they are used as part of the content that a professional presenter will present to consumers receiving the studio's broadcast. Alternatively, it may be that this member of the studio personnel is a professional presenter who (either alone or with other professional presenters) more directly obtains the sentences from the presenting device 700*a* (possibly during a live broadcast) and uses them in presenting his/her review of game A in that broadcast to consumers.

In another example embodiment differing somewhat from the example embodiment just described, game A of the first sport, again, is in progress. However, unlike the above example embodiment, statistical anomalies related to game A are to be presented to consumers as game A is played, instead of only after game A has ended. Thus, as game A is played, and as statistical information arising from the game play in game A is received and added to the statistics data 230, the processor circuit 450 is caused to repeatedly search the statistics data 230 for statistical anomalies related to game A, repeatedly rank statistical anomalies identified as meeting requirements, repeatedly automatically generate sentences stating or describing the statistical anomalies, and repeatedly transmit those automatically generated sentences to one or more other computing devices, at least until game A ends.

Figure 6:
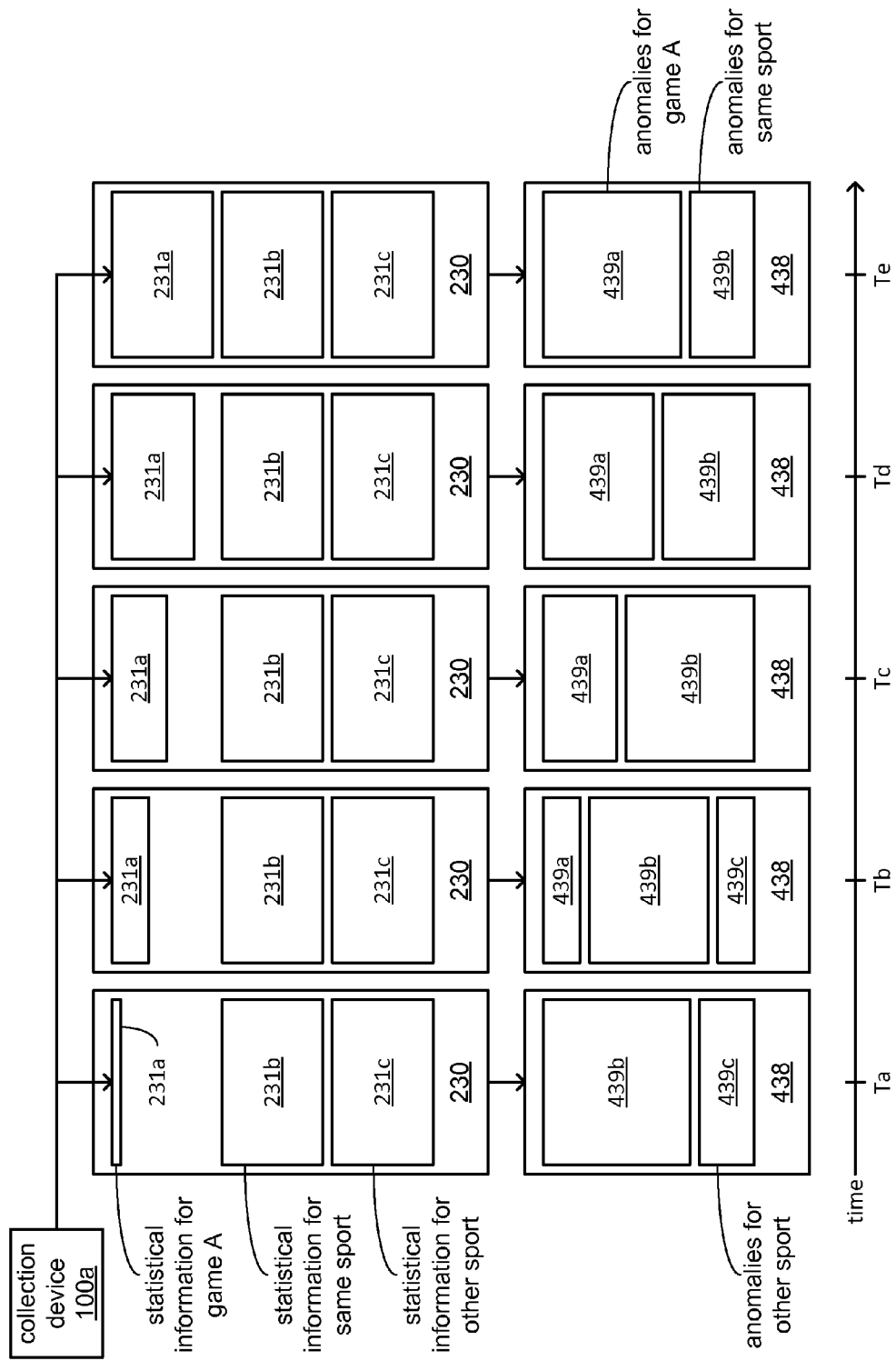
FIG. 6 illustrates an example using the embodiment of FIG. 1.

Understandably, early in game A, it is likely that not enough play has yet occurred to generate enough statistical information to enable the desired number of statistical anomalies specified in the configuration data 431 to be found in statistical information related solely to the play of game A. Therefore, statistical information within the statistics data 230 that is more remotely related to game A will likely need to be included in searches for statistical anomalies, at least initially, such as statistical information connected with another game in the same sport as game A (e.g., game B) and/or statistical information connected with the players or location connected to game A. FIG. 6 presents a block diagram of the manner in which the initial dearth and subsequent accumulation of statistical information related solely to the play of game A affects what statistical anomalies are identified and relied upon in satisfying a requirement of a desired number of statistical anomalies specified in the configuration data 431 over a span of time from time point Ta through time point Te.

Starting at time point Ta, where play in game A is just starting, the statistics data 230 comprises very little statistical information 231*a* arising from play in game A, much more complete statistical information 231*b* for other games in the same sport as game A (e.g., game B for which the collection device 100*b* collects or has collected statistical information), and much more complete statistical information 231*c* for games in one or more other sports (e.g., the game of the second sport for which the collection device 100*c* collects or has collected statistical information). As a result of this initial dearth of statistical information related solely to the play of game A, the repeated searching, ranking, and automatic generation of sentences performed by the processor circuit 450 results in the presentation data 438 comprising only sentences 439*b* describing statistical anomalies found in statistical information more remotely related to game A (e.g., statistical anomalies arising from the play of game B), and possibly sentences 439*c* describing statistical anomalies found in statistical information related to a game of a different sport (e.g., statistical anomalies arising from the play of the game of the second sport).

However, as play of game A progresses, at time point Tb, the statistics data 230 starts to include a more significant amount of statistical information 231*a* related solely to the game play of game A. This results in the presentation data 438 including one or more sentences 439*a* related more closely to the play of game A, and a reduction in the inclusion of sentences 439*c*, as the repeated searching, ranking and automatic generation of sentences continues. In embodiments in which ranking of statistical anomalies is at least partly based on closeness of relation of each statistical anomaly to a particular game (game A, in this example), this reduction in the inclusion of sentences 439*c* occurs as a result of statistical anomalies related to games of a sport other than the sport to which game A belongs being ranked lower and lower in comparison to other statistical anomalies as more and more statistical anomalies closely related to the play of game A are identified. Thus, as the play of game A continues through time points Tc and Td, and ultimately ends at time point Te, the sentences 439*c* eventually cease to be included in the presentation data 438, and the sentences 439*a* that are most closely related to game A become the majority of the sentences of which the presentation data 438 is composed.

During play of game A, from time point Ta through time point Te, the processor circuit 450 is caused to repeatedly format the sentences that it repeatedly generates and stores as the presentation data 438 into one or more machine-readable formats appropriate for transmission to one or more of the presentation devices 700*a-c*. Following the end of play of game A, the processor circuit 450 is caused to complete a last search of the statistics data 230 for statistical anomalies meeting the requirements specified by the configuration data 431, and then to rank a final set of statistical anomalies and automatically generate a final set of sentences describing those statistical anomalies. Then, following generation of a final set of sentences, the processor circuit 450 is caused to format those sentences into one or more machine-readable formats appropriate for transmission to one or more of the presentation devices 700*a-c*. It should be noted that the choice of machine-readable formats for transmission to presentation devices during game play may differ from the choice of machine-readable formats for transmission to presentations device following the end of game play. More specifically, during game play, sentences of the presentation data 438 may be formatted for transmission as SMS text messages for visual presentation by a smartphone, or as data accompanying the transmission of live video images of the game in a format enabling visual presentation on a display of an interactive television as a crawler (e.g., the crawler or ticker 781 depicted as visually presented on the display 780 of the presentation device 700*a*) or window (e.g., the window 782). Later, following game play, a final set of the sentences associated with that game may be formatted in HTML, XML, SGML, JSON, etc., for inclusion in a webpage of a website providing a post-game review that may be transmitted to a presentation device employing a web browser to view that webpage.

Figure 7:
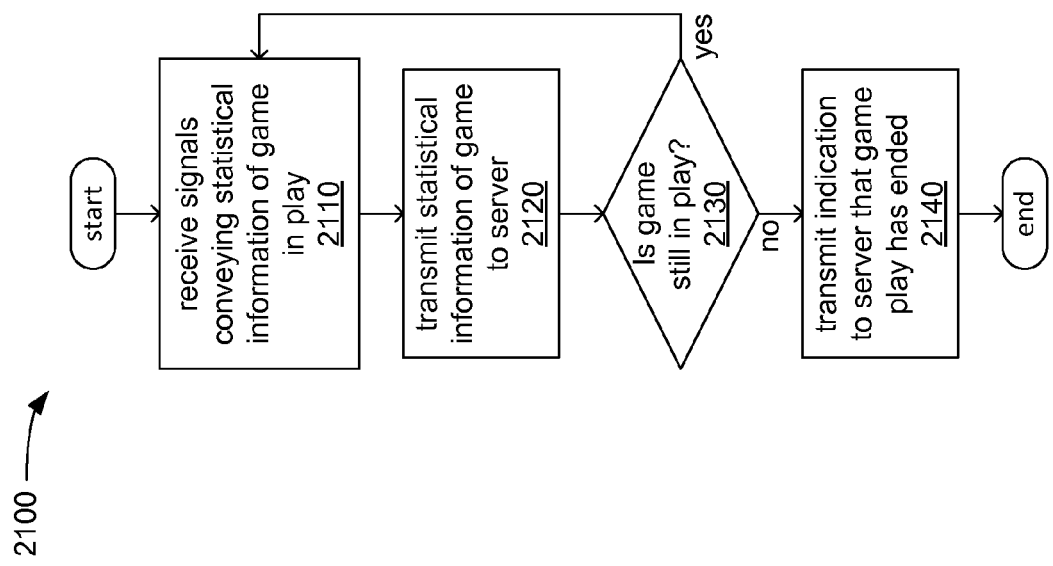
FIG. 7 illustrates an embodiment of a first logic flow.

FIG. 7 illustrates an embodiment of a logic flow 2100. The logic flow 2100 may be representative of some or all of the operations executed by one or more embodiments described herein. More specifically, the logic flow 2100 may illustrate operations performed by the processor circuit 150 of one of the collection devices 100a-c in executing at least the control routine 140.

At 2110, a collection device (e.g., one of the collection devices 100a-c) receives signals conveying to it statistical information of a game in play. As has been discussed, these signals may emanate from controls operated to manually enter the statistical information and/or be received from transponders (or other automated sensors) automatically providing the statistical information.

If, at 2120, the collection device transmits the statistical information to a server that accumulates and stores such statistical information (e.g., the statistics server 200, or the preparation device 400 performing the functions of the statistics server 200).

At 2130, a check is made as to whether the game for which the collection device is collecting statistical information is still in progress. If the game is still in progress, then the collection device receives signals conveying more statistical information to it at 2110.

However, if the game is not still in progress, then at 2140, the collection device signals the server within an indication that play has ended in the game.

Figure 8:
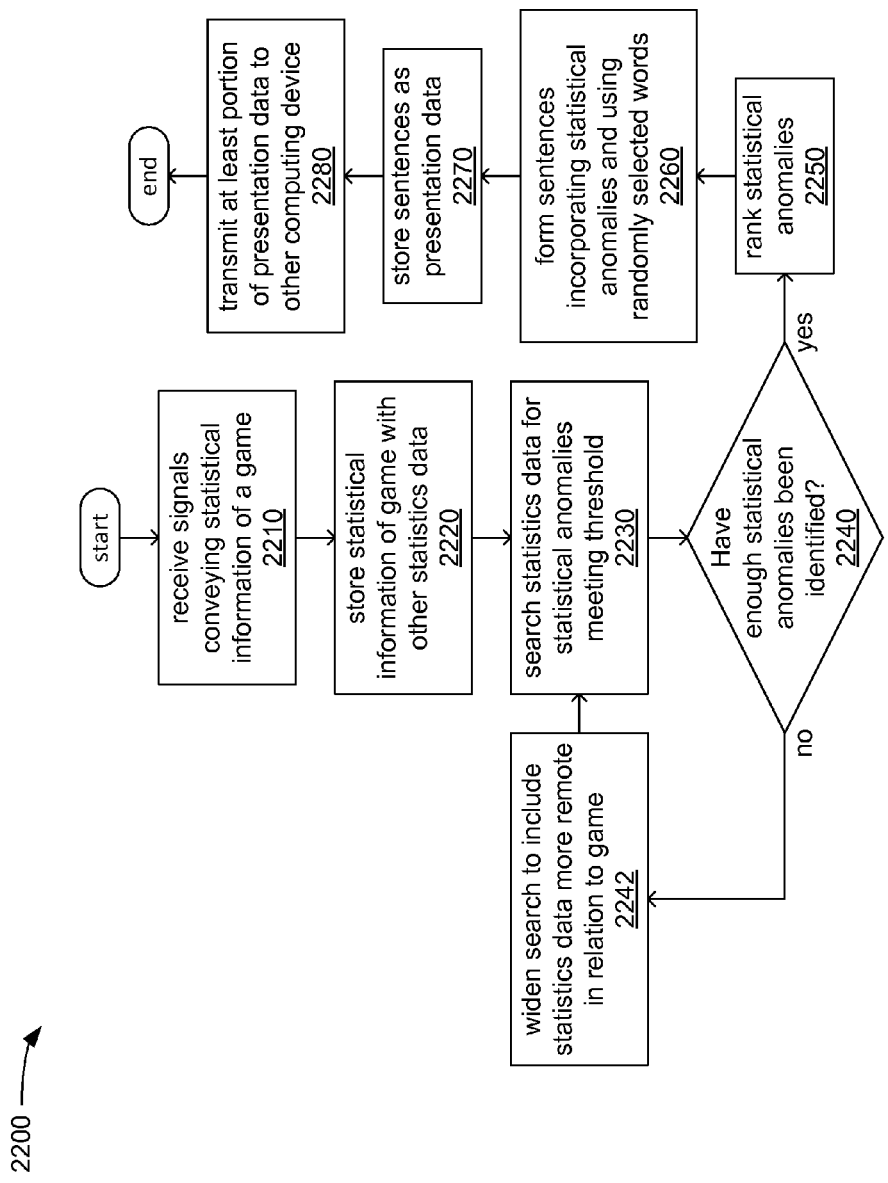
FIG. 8 illustrates an embodiment of a second logic flow.

FIG. 8 illustrates an embodiment of a logic flow 2200. The logic flow 2200 may be representative of some or all of the operations executed by one or more embodiments described herein. More specifically, the logic flow 2200 may illustrate operations performed by at least the processor circuit 450 of the preparation device 400 in executing at least the control routine 440.

At 2210, a preparation device (e.g., the preparation device 400) performing the functions of a statistics server (e.g., the statistics server 200) receives statistical information concerning play of a game. At 2220, the preparation device adds the statistical information to a statistics data in which statistical information of multiple games is stored. As previously discussed, such receipt and accumulation of statistical information of individual games may be performed by a computing device functioning as a separate and distinct server, or may be performed by the same computing device that performs searches on the accumulated statistics data.

At 2230, the preparation device searches the statistics data for statistical anomalies meeting a specified threshold of deviation. As has been discussed, the preparation device employs comparisons of statistics within a set of statistical information of the statistics data to identify statistical anomalies. The threshold of deviation that must be found through such comparisons to identify such statistical anomalies may be specified in a configuration data employed by the preparation device, and may be described in units of standard deviation (e.g., 2σ, 3σ, 4σ, etc.).

At 2240, a check is made as to whether enough statistical anomalies meeting the specified threshold of deviation have been identified. If not, then the set of statistical information that is searched within the statistics data for such statistical anomalies is widened at 2242, and the search is repeated at 2230.

However, if enough statistical anomalies have been identified, then at 2250, the preparation device ranks the identified statistical anomalies. As previously discussed, ranking may be based on one or both of the degree of deviation and degree of closeness of relationship to the game.

At 2260, the preparation device automatically forms sentences incorporating the statistical anomalies to state or otherwise describe each of the statistical anomalies in textual form. In so doing, the preparation device randomly selects verbs or other words of a vocabulary stored as part of a language data.

At 2270, these sentences are stored by the preparation device as a presentation data, and at least a portion of the presentation data is transmitted to another computing device at 2280.

Figure 9:
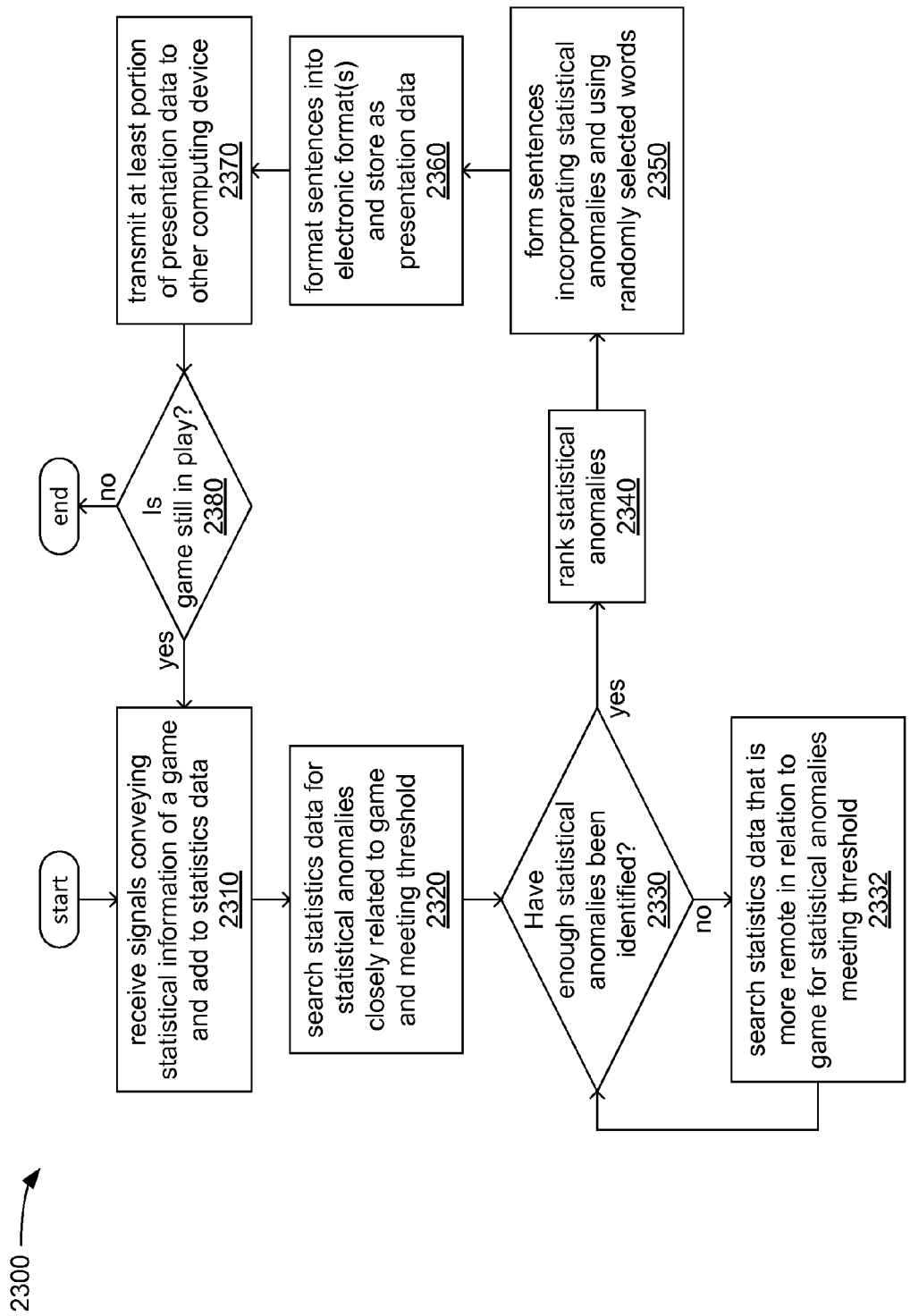
FIG. 9 illustrates an embodiment of a third logic flow.

FIG. 9 illustrates an embodiment of a logic flow 2300. The logic flow 2300 may be representative of some or all of the operations executed by one or more embodiments described herein. More specifically, the logic flow 2300 may illustrate operations performed by at least the processor circuit 450 of the preparation device 400 in executing at least the control routine 440.

At 2310, a preparation device (e.g., the preparation device 400) performing the functions of a statistics server (e.g., the statistics server 200) receives statistical information concerning play of a game and adds the statistical information to a statistics data in which statistical information of multiple games is stored.

At 2320, the preparation device searches statistical information within the statistics data that is closely related to the game for statistical anomalies meeting a specified threshold of deviation.

At 2330, a check is made as to whether enough statistical anomalies meeting the specified threshold of deviation have been identified. If not, then the set of statistical information that is searched within the statistics data for statistical anomalies is widened and a search of the widened set of statistical information is performed at 2332, before the number of statistical anomalies identified is checked again at 2330.

However, if enough statistical anomalies have been identified, then at 2340, the preparation device ranks the identified statistical anomalies.

At 2360, the preparation device automatically forms sentences incorporating the statistical anomalies to state or otherwise describe each of the statistical anomalies in textual form, and these sentences are stored by the preparation device as a presentation data at 2370.

At 2370, at least a portion of the presentation data is transmitted to another computing device.

At 2380, a check is made as to whether the game is still in play. If not, then there is no further searching, ranking, or sentence generation focused on the game. However, if the game is still in play, then the preparation device again receives signals conveying statistical information arising from play of the game at 2310. In this way, the searching, ranking, sentence generation, and sentence formatting are caused to repeat until play of the game ceases.

Figure 10:
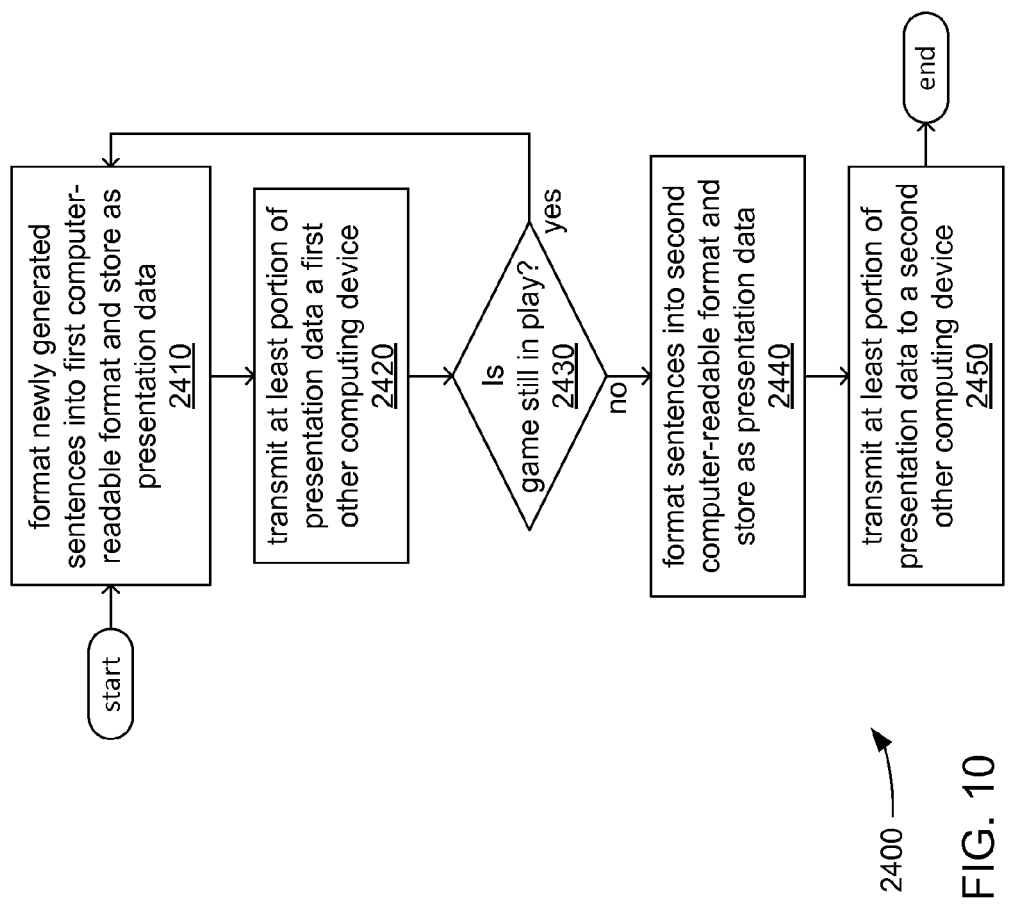
FIG. 10 illustrates an embodiment of a fourth logic flow.

FIG. 10 illustrates one embodiment of a logic flow 2400. The logic flow 2400 may be representative of some or all of the operations executed by one or more embodiments described herein. More specifically, the logic flow 2400 may illustrate operations performed by at least the processor circuit 450 of the preparation device 400 in executing at least the control routine 440.

At 2410, a preparation device (e.g., the preparation device 400) formats sentences that are newly automatically generated by the preparation device into a first machine-readable format and stores those sentences as part of a presentation data.

At 2420, the preparation device transmits at least a portion of the presentation data to a first other computing device (e.g., the presentation server 600, or one of the presentation devices 700*a-c*).

At 2430, a check is made as to whether the game for which the sentences describe related statistical anomalies is still in play. If so, then the preparation device formats more newly automatically generated sentences at 2410.

However, if the game is not still in progress, then at 2440, the preparation device formats sentences describing statistical anomalies of the game are formatted into a second machine-readable format and stored as part of the presentation data. As previously discussed, there may be different machine-readable formats into which such sentences are formatted for transmission during play of the game versus transmission following the end of play of the game.

At 2450, the preparation device transmits at least a portion of the presentation data to a second other computing device.

Figure 11:
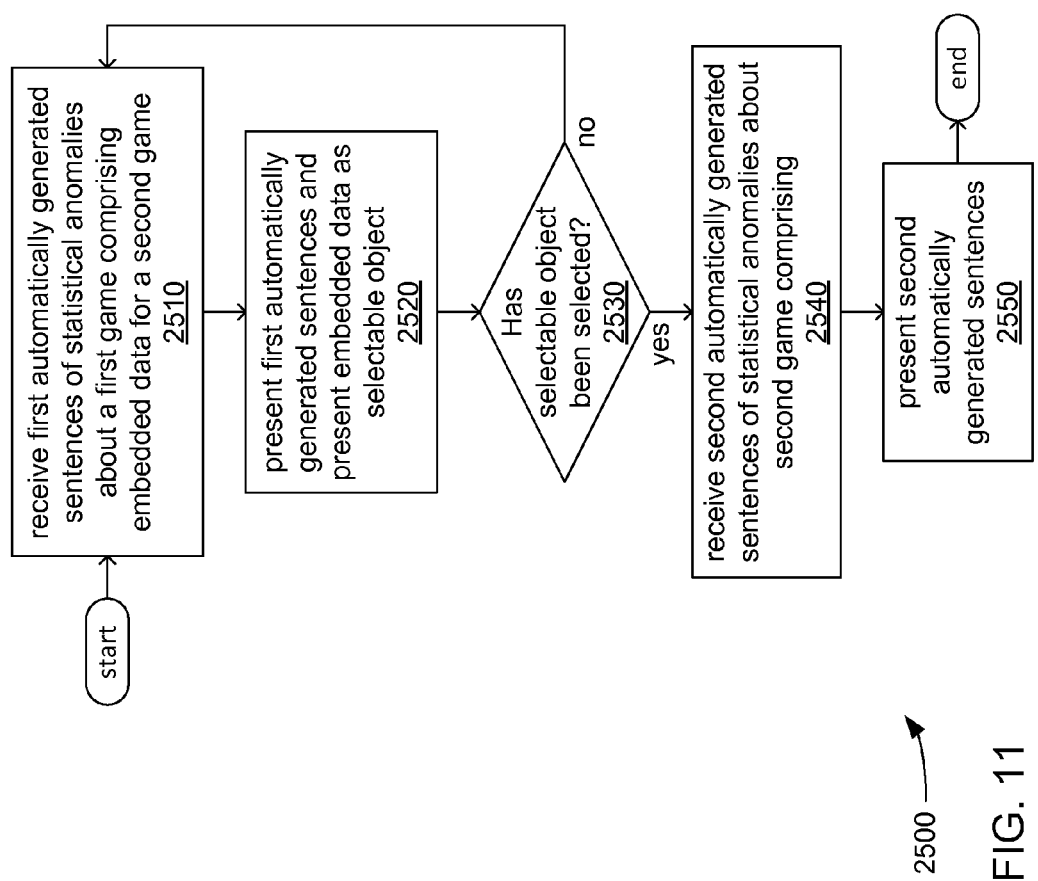
FIG. 11 illustrates an embodiment of a fifth logic flow.

FIG. 11 illustrates one embodiment of a logic flow 2500. The logic flow 2500 may be representative of some or all of the operations executed by one or more embodiments described herein. More specifically, the logic flow 2500 may illustrate operations performed by at least the processor circuit 750 of one of the presentation devices 700*a-c* in executing at least the control routine 740.

At 2510, a presentation device (e.g., one of the presentation devices 700*a-c*) receives signals conveying a first set of automatically generated sentences describing statistical anomalies related to a first game, in which one of these sentences comprises embedded data associated with a second game.

At 2520, the presentation device presents the first set of automatically generated sentences and presents the embedded data as a selectable object. As has been discussed, the presentation of such automatically generated sentences may be performed visually (e.g., on the display 780) and/or audibly (e.g., a computer-generated voice reading such sentences aloud). As has also been discussed, such embedded data may be visually presented on as a selectable object that may be selected through operation of controls of a presentation device (e.g., the controls 720).

At 2530, a check is made as to whether the selectable object has been selected. If not, then the presentation device returns to receiving signals conveying more of the first set of automatically generated sentences associated with the first game at 2510.

However, if the selectable object has been selected, then the presentation device receives signals conveying a second set of automatically generated sentences describing statistical anomalies related to the second game at 2540.

At 2550, the presentation device presents the second set of automatically generated sentences.

Figure 12:
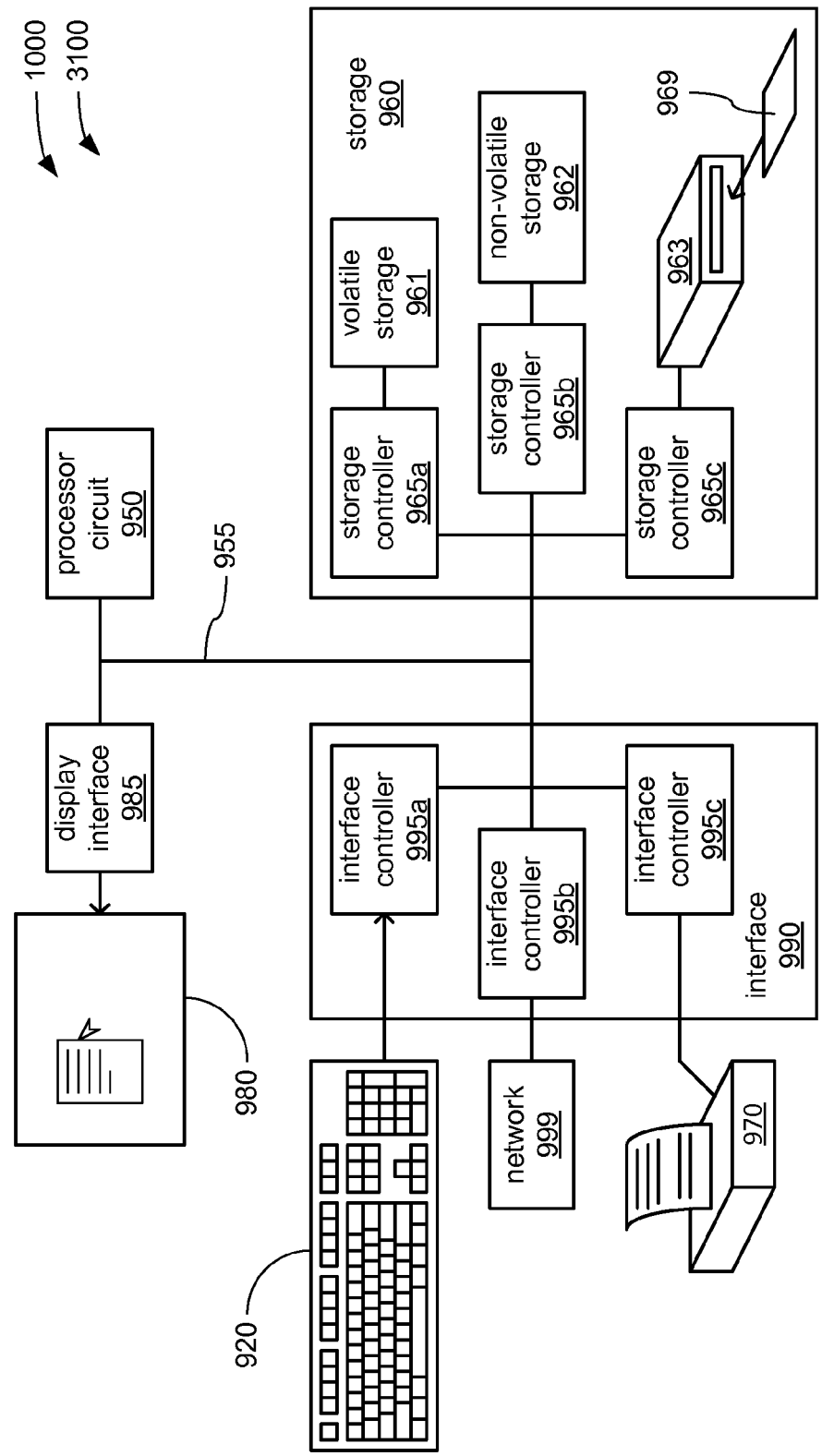
FIG. 12 illustrates an embodiment of a processing architecture.

FIG. 12 illustrates an embodiment of an exemplary processing architecture 3100 suitable for implementing various embodiments as previously described. More specifically, the processing architecture 3100 (or variants thereof) may be implemented as part of one or more of the computing devices 100*a-c*, 200, 400, 600 and 700*a-c*. It should be noted that components of the processing architecture 3100 are given reference numbers in which the last two digits correspond to the last two digits of reference numbers of components earlier depicted and described as part of each of the computing devices 100*a-c*, 200, 400, 600 and 700*a-c*. This is done as an aid to correlating such components of whichever ones of the computing devices 100*a-c*, 200, 400, 600 or 700*a-c* may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100*a-c*, 200, 400, 600 or 700*a-c* implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 250, 450, 650 or 750) may comprise any of a wide variety of commercially available processors, employing any of a wide variety of technologies and implemented with one or more cores physically combined in any of a number of ways.

As previously discussed, the storage 960 (corresponding to one or more of the storages 160, 260, 460, 660 or 760) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 290, 490, 690 and 790) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920 (perhaps corresponding to one or more of the controls 120 and 420). The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or more of the displays 480 and 780), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices 100a-c, 200, 400, 600 and 700a-c may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a processor circuit and a storage communicatively coupled to the processor circuit and arranged to store instructions. The instructions are operative on the processor circuit to receive signals that convey a first set of statistical information closely related to play of a first game; search the first set of statistical information for a first set of statistical anomalies; and in response to the first set of statistical anomalies comprising an insufficient number of statistical anomalies, search a second set of statistical information less closely related to play of the first game for a second set of statistical anomalies, and transmit a multitude of sentences that describe statistical anomalies of the first and second sets of statistical anomalies to a computing device.

The above example of an apparatus in which the apparatus comprises an interface operative to communicatively couple the processor circuit to a network.

Either of the above examples of an apparatus in which the instructions are operative on the processor circuit to receive signals via the network that convey the second set of statistical information, the second set of statistical information closely related to play of a second game.

Any of the above examples of an apparatus in which the instructions are operative on the processor circuit to receive a signal via the network that indicates the first game is still in progress; in response to reception of the signal that indicates the first game is still in progress, receive signals via the network that convey further statistical information closely related to play of the first game; add the further statistical information to the first set of statistical information; search the first set of statistical information for further statistical anomalies; add the further statistical anomalies to the first set of statistical anomalies; and in response to the first set of statistical anomalies comprising a sufficient number of statistical anomalies, transmit another multitude of sentences that describe statistical anomalies of the first set of statistical anomalies to the computing device via the network.

Any of the above examples of an apparatus in which the instructions are operative on the processor circuit to search the first set of statistical information for the first set of statistical anomalies by searching for statistical anomalies deviating from a normal distribution of statistics of the first set of statistical information to at least a specified degree of standard deviation.

Any of the above examples of an apparatus in which the instructions are operative on the processor circuit to rank statistical anomalies of at least the first set of statistical anomalies by degree of standard deviation.

Any of the above examples of an apparatus in which the instructions are operative on the processor circuit to rank statistical anomalies of the first and second sets of statistical anomalies by degree of closeness of relationship to the first game.

Any of the above examples of an apparatus in which the instructions are operative on the processor circuit to generate a sentence of the multitude of sentences in a specified language for each statistical anomaly of at least the first set of statistical anomalies employing a multitude of syntactic rules of a language data stored in the storage, each sentence comprising a statement of a statistical anomaly; and randomly select at least one verb for each statement of a statistical anomaly from the language data.

Any of the above examples of an apparatus in which the instructions are operative on the processor circuit to modify a likelihood of random selection of the at least one verb with at least one weighting value.

Any of the above examples of an apparatus in which the instructions are operative on the processor circuit to format each sentence of the multitude of sentences into a specified machine-readable format for transmission to the computing device via the network.

An example of another apparatus comprises a processor circuit, an interface operative to communicatively couple the apparatus to a network, and a storage communicatively coupled to the processor circuit and arranged to store instructions. The instructions are operative on the processor circuit to receive signals via the network that convey a set of statistical information closely related to play of a first game; generate a first multitude of sentences in a specified language that describe statistical anomalies identified in the set of statistical information employing a multitude of syntactic rules of a language data stored in the storage, each sentence comprising a statement of a statistical anomaly; randomly select at least a verb for each statement of a statistical anomaly from the language data; and transmit the first multitude of sentences to a first computing device via the network.

The above example of another apparatus in which the instructions are operative on the processor circuit to modify a likelihood of random selection of the at least one verb with at least one weighting value.

Either of the above examples of another apparatus in which the instructions are operative on the processor circuit to format each sentence of the first multitude of sentences into a first specified machine-readable format for transmission to the first computing device.

Any of the above examples of another apparatus in which the instructions are operative on the processor circuit to format each sentence of the first multitude of sentences into a second specified machine-readable format for transmission to a second computing device.

Any of the above examples of another apparatus in which the instructions are operative on the processor circuit to receive a signal via the network that indicates the first game is still in progress; and in response to reception of the signal that indicates the first game is still in progress, transmit the first multitude of sentences to the first computing device in the first specified machine-readable format.

Any of the above examples of another apparatus in which the instructions are operative on the processor circuit to receive a signal via the network that indicates the first game has ended; and in response to reception of the signal that indicates the first game has ended, transmit the first multitude of sentences to the second computing device in the second specified machine-readable format.

Any of the above examples of another apparatus in which the instructions are operative on the processor circuit to embed data in the first multitude of sentences associated with a second game; receive a signal from the first computing device that indicates that the embedded data has been selected as a selectable object; and in response to reception of the signal that indicates that the embedded data has been selected, cease transmitting the first multitude of sentences to the first computing device and transmit a second multitude of sentences that describe statistical anomalies associated with the second game to the first computing device.

Any of the above examples of another apparatus in which the first computing device comprises one of a presentation server that transmits at least a portion of the first multitude of sentences to a presentation device, and a presentation device.

Any of the above examples of another apparatus in which the instructions are operative on the processor circuit to receive signals that convey a configuration data that specifies at least one of a selection of a game as the first game, a degree of deviation required of the statistical anomalies identified, the specified language, a syntactic rule of the specified language, a verb of the specified language, and a machine-readable format into which to format the multitude of sentences.

An example of a computer-implemented method comprises receiving signals via a network conveying a first set of statistical information closely related to play of a first game; searching the first set of statistical information for a first set of statistical anomalies; ranking statistical anomalies of the first set of statistical anomalies by degree of deviation from a normal distribution; generating a multitude of sentences in a specified language describing statistical anomalies of the first set of statistical anomalies, each sentence comprising a statement of a statistical anomaly; randomly selecting at least a verb for each statement of a statistical anomaly; and transmitting the multitude of sentences to a first computing device via the network.

The above example of a computer-implemented method in which searching the first set of statistical information for the first set of statistical anomalies comprises searching for statistical anomalies deviating from a normal distribution of statistics of the first set of statistical information to at least a specified degree of standard deviation.

Either of the above examples of a computer-implemented method in which ranking the statistical anomalies of the first set of statistical anomalies comprises ranking the statistical the statistical anomalies of the first set of statistical anomalies by degree of standard deviation.

Any of the above examples of a computer-implemented method in which the method comprises receiving signals via the network conveying a second set of statistical information closely related to play of a second game.

Any of the above examples of a computer-implemented method in which the method comprises, in response to the first set of statistical anomalies comprising an insufficient number of statistical anomalies, searching the second set of statistical information for a second set of statistical anomalies; ranking statistical anomalies of the first and second sets of statistical anomalies at least by degrees of deviation from normal distributions; generating the multitude of sentences in the specified language describing statistical anomalies of the first and second sets of statistical anomalies; and transmit the multitude of sentences to the first computing device via the network.

Any of the above examples of a computer-implemented method in which the method comprises receiving a signal via the network indicating the first game is still in progress; in response to the signal indicating the first game is still in progress, receiving signals via the network conveying further statistical information closely related to play of the first game; adding the further statistical information to the first set of statistical information; searching the first set of statistical information for further statistical anomalies; ranking the further statistical anomalies of the first set of statistical anomalies by degree of deviation from a normal distribution; and generating further sentences in a specified language describing the further statistical anomalies.

Any of the above examples of a computer-implemented method in which the method comprises formatting each sentence of the multitude of sentences into a first specified machine-readable format for transmission to the first computing device.

Any of the above examples of a computer-implemented method in which the method comprises formatting each sentence of the multitude of sentences into a second specified machine-readable format for transmission to a second computing device.

Any of the above examples of a computer-implemented method in which the method comprises receiving a signal via the network indicating the first game is still in progress; and in response to the signal indicating the first game is still in progress, transmitting the multitude of sentences to the first computing device in the first specified machine-readable format.

Any of the above examples of a computer-implemented method in which the method comprises receiving a signal via the network indicating the first game has ended; and in response to the signal indicating the first game has ended, transmitting the multitude of sentences to the second computing device in the second specified machine-readable format.

An example of at least one machine-readable storage medium comprises instructions that when executed by a computing device, cause the computing device to receive signals via a network conveying a first set of statistical information closely related to play of a first game; search the first set of statistical information for a first set of statistical anomalies; and in response to the first set of statistical anomalies comprising an insufficient number of statistical anomalies, search a second set of statistical information less closely related to play of the first game for a second set of statistical anomalies, and transmit a multitude of sentences describing statistical anomalies of the first and second sets of statistical anomalies to a computing device via the network.

The above example of at least one machine-readable storage medium in which the computing device is caused to generate a sentence of the multitude of sentences in a specified language for each statistical anomaly of at least the first set of statistical anomalies employing a multitude of syntactic rules of a language data stored in the storage, each sentence comprising a statement of a statistical anomaly; randomly select at least a verb for each statement of a statistical anomaly from the language data; and format each sentence of the multitude of sentences into a specified machine-readable format for transmission to the computing device via the network.

Either of the above examples of at least one machine-readable storage medium in which the computing device is caused to receive a signal via the network indicating the first game is still in progress; in response to the signal indicating the first game is still in progress, transmit the multitude of sentences to the computing device in the first specified machine-readable format; receive a signal via the network indicating the first game has ended; and in response to the signal indicating the first game has ended, transmit the multitude of sentences to the computing device in the second specified machine-readable format.

The invention claimed is:

1. An apparatus comprising:
a processor circuit; and
a storage communicatively coupled to the processor circuit and arranged to store instructions operative on the processor circuit to:
receive signals that convey a first set of statistical information related to play of a first game;
search the first set of statistical information for a first set of statistical anomalies; and
in response to the first set of statistical anomalies comprising an insufficient number of statistical anomalies, search a second set of statistical information less closely related to play of the first game for a second set of statistical anomalies, and transmit a multitude of sentences that describe statistical anomalies of the first and second sets of statistical anomalies to a computing device.

2. The apparatus of claim 1, comprising an interface operative to communicatively couple the processor circuit to a network.

3. The apparatus of claim 2, the instructions operative on the processor circuit to receive signals via the network that convey the second set of statistical information, the second set of statistical information closely related to play of a second game.

4. The apparatus of claim 2, the instructions operative on the processor circuit to:
receive a signal via the network that indicates the first game is still in progress;
in response to reception of the signal that indicates the first game is still in progress, receive signals via the network that convey further statistical information closely related to play of the first game;
add the further statistical information to the first set of statistical information;
search the first set of statistical information for further statistical anomalies;
add the further statistical anomalies to the first set of statistical anomalies; and
in response to the first set of statistical anomalies comprising a sufficient number of statistical anomalies, transmit another multitude of sentences that describe statistical anomalies of the first set of statistical anomalies to the computing device via the network.

5. The apparatus of claim 1, the instructions operative on the processor circuit to search the first set of statistical information for the first set of statistical anomalies by searching for statistical anomalies deviating from a normal distribution of statistics of the first set of statistical information to at least a specified degree of standard deviation.

6. The apparatus of claim 5, the instructions operative on the processor circuit to rank statistical anomalies of at least the first set of statistical anomalies by degree of standard deviation.

7. The apparatus of claim 1, the instructions operative on the processor circuit to rank statistical anomalies of the first and second sets of statistical anomalies by degree of closeness of relationship to the first game.

8. The apparatus of claim 1, the instructions operative on the processor circuit to:
generate a sentence of the multitude of sentences in a specified language for each statistical anomaly of at least the first set of statistical anomalies employing a multitude of syntactic rules of a language data stored in the storage, each sentence comprising a statement of a statistical anomaly; and randomly select at least one verb for each statement of a statistical anomaly from the language data.

9. The apparatus of claim 8, the instructions operative on the processor circuit to modify a likelihood of random selection of the at least one verb with at least one weighting value.

10. The apparatus of claim 8, the instructions operative on the processor circuit to format each sentence of the multitude of sentences into a specified machine-readable format for transmission to the computing device via the network.

11. An apparatus comprising:
a processor circuit;
an interface operative to communicatively couple the processor circuit to a network; and
a storage communicatively coupled to the processor circuit and arranged to store instructions operative on the processor circuit to:
receive signals via the network that convey a set of statistical information closely related to play of a first game;
generate a first multitude of sentences in a specified language that describe statistical anomalies identified in the set of statistical information employing a multitude of syntactic rules of a language data stored in the storage, each sentence comprising a statement of a statistical anomaly;
randomly select at least a verb for each statement of a statistical anomaly from the language data; and
transmit the first multitude of sentences to a first computing device via the network.

12. The apparatus of claim 11, the instructions operative on the processor circuit to modify a likelihood of random selection of the at least one verb with at least one weighting value.

13. The apparatus of claim 11, the instructions operative on the processor circuit to format each sentence of the first multitude of sentences into a first specified machine-readable format for transmission to the first computing device.

14. The apparatus of claim 13, the instructions operative on the processor circuit to format each sentence of the first multitude of sentences into a second specified machine-readable format for transmission to a second computing device.

15. The apparatus of claim 13, the instructions operative on the processor circuit to:
receive a signal via the network that indicates the first game is still in progress; and
in response to reception of the signal that indicates the first game is still in progress, transmit the first multitude of sentences to the first computing device in the first specified machine-readable format.

16. The apparatus of claim 13, the instructions operative on the processor circuit to:
receive a signal via the network that indicates the first game has ended; and
in response to reception of the signal that indicates the first game has ended, transmit the first multitude of sentences to the second computing device in the second specified machine-readable format.

17. The apparatus of claim 11, the instructions operative on the processor circuit to:
embed data in the first multitude of sentences associated with a second game;
receive a signal from the first computing device that indicates that the embedded data has been selected as a selectable object; and
in response to reception of the signal that indicates that the embedded data has been selected, cease transmitting the first multitude of sentences to the first computing device and transmit a second multitude of sentences that describe statistical anomalies associated with the second game to the first computing device.

18. The apparatus of claim 11, the first computing device comprises one of a presentation server that transmits at least a portion of the first multitude of sentences to a presentation device, and a presentation device.

19. The apparatus of claim 11, the instructions operative on the processor circuit to receive signals that convey a configuration data that specifies at least one of a selection of a game as the first game, a degree of deviation required of the statistical anomalies identified, the specified language, a syntactic rule of the specified language, a verb of the specified language, and a machine-readable format into which to format the multitude of sentences.

20. A computer-implemented method comprising:
receiving signals via a network conveying a first set of statistical information closely related to play of a first game;
searching the first set of statistical information for a first set of statistical anomalies;
ranking statistical anomalies of the first set of statistical anomalies by degree of deviation from a normal distribution;
generating a multitude of sentences in a specified language describing statistical anomalies of the first set of statistical anomalies, each sentence comprising a statement of a statistical anomaly;
randomly selecting at least a verb for each statement of a statistical anomaly; and
transmitting the multitude of sentences to a first computing device via the network.

21. The computer-implemented method of claim 20, searching the first set of statistical information for the first set of statistical anomalies comprises searching for statistical anomalies deviating from a normal distribution of statistics of the first set of statistical information to at least a specified degree of standard deviation.

22. The computer-implemented method of claim 21, ranking the statistical anomalies of the first set of statistical anomalies comprises ranking the statistical the statistical anomalies of the first set of statistical anomalies by degree of standard deviation.

23. The computer-implemented method of claim 20, comprising receiving signals via the network conveying a second set of statistical information closely related to play of a second game.

24. The computer-implemented method of claim 23, comprising in response to the first set of statistical anomalies comprising an insufficient number of statistical anomalies:
searching the second set of statistical information for a second set of statistical anomalies;
ranking statistical anomalies of the first and second sets of statistical anomalies at least by degrees of deviation from normal distributions;
generating the multitude of sentences in the specified language describing statistical anomalies of the first and second sets of statistical anomalies; and
transmit the multitude of sentences to the first computing device via the network.

25. The computer-implemented method of claim 23, comprising:
receiving a signal via the network indicating the first game is still in progress;

in response to the signal indicating the first game is still in progress, receiving signals via the network conveying further statistical information closely related to play of the first game;

adding the further statistical information to the first set of statistical information;

searching the first set of statistical information for further statistical anomalies;

ranking the further statistical anomalies of the first set of statistical anomalies by degree of deviation from a normal distribution; and generating further sentences in a specified language describing the further statistical anomalies.

26. The computer-implemented method of claim 20, comprising formatting each sentence of the multitude of sentences into a first specified machine-readable format for transmission to the first computing device.

27. The computer-implemented method of claim 26, comprising formatting each sentence of the multitude of sentences into a second specified machine-readable format for transmission to a second computing device.

28. The computer-implemented method of claim 26, comprising:

receiving a signal via the network indicating the first game is still in progress; and in response to the signal indicating the first game is still in progress, transmitting the multitude of sentences to the first computing device in the first specified machine-readable format.

29. The computer-implemented method of claim 26, comprising:

receiving a signal via the network indicating the first game has ended; and in response to the signal indicating the first game has ended, transmitting the multitude of sentences to the second computing device in the second specified machine-readable format.

30. At least one machine-readable storage medium comprising instructions that when executed by a computing device, cause the computing device to:

receive signals via a network conveying a first set of statistical information closely related to play of a first game;

search the first set of statistical information for a first set of statistical anomalies; and in response to the first set of statistical anomalies comprising an insufficient number of statistical anomalies, search a second set of statistical information less closely related to play of the first game for a second set of statistical anomalies, and transmit a multitude of sentences describing statistical anomalies of the first and second sets of statistical anomalies to a computing device via the network.

31. The at least one machine-readable storage medium of claim 30, the computing device caused to:

generate a sentence of the multitude of sentences in a specified language for each statistical anomaly of at least the first set of statistical anomalies employing a multitude of syntactic rules of a language data stored in the storage, each sentence comprising a statement of a statistical anomaly;

randomly select at least a verb for each statement of a statistical anomaly from the language data; and format each sentence of the multitude of sentences into a specified machine-readable format for transmission to the computing device via the network.

32. The at least one machine-readable storage medium of claim 31, the computing device caused to:

receive a signal via the network indicating the first game is still in progress;

in response to the signal indicating the first game is still in progress, transmit the multitude of sentences to the computing device in the first specified machine-readable format;

receive a signal via the network indicating the first game has ended; and in response to the signal indicating the first game has ended, transmit the multitude of sentences to the computing device in the second specified machine-readable format.

* * * * *